United States Patent
Garrett et al.

(10) Patent No.: US 11,847,871 B2
(45) Date of Patent: Dec. 19, 2023

(54) TECHNOLOGIES FOR VERIFYING CONTROL SYSTEM OPERATION

(71) Applicant: Airbiquity Inc., Seattle, WA (US)

(72) Inventors: Darrin L. Garrett, Kingston, WA (US); Keefe Leung, Seattle, WA (US)

(73) Assignee: AIRBIQUITY INC., Seattle, WA (US)

( * ) Notice: Subject to any disclaimer, the term of this patent is extended or adjusted under 35 U.S.C. 154(b) by 0 days.

(21) Appl. No.: 17/882,435

(22) Filed: Aug. 5, 2022

(65) Prior Publication Data

US 2022/0375279 A1  Nov. 24, 2022

Related U.S. Application Data

(63) Continuation of application No. 16/352,711, filed on Mar. 13, 2019, now Pat. No. 11,455,843, which is a
(Continued)

(51) Int. Cl.
*G07C 5/08* (2006.01)
*G07C 5/00* (2006.01)
(Continued)

(52) U.S. Cl.
CPC ........ *G07C 5/0808* (2013.01); *B60R 16/0234* (2013.01); *G07C 5/008* (2013.01);
(Continued)

(58) Field of Classification Search
CPC .... G07C 5/0808; G07C 5/008; G07C 5/0841; B60R 16/0234; F02D 41/2487; G01S 19/42
See application file for complete search history.

(56) References Cited

U.S. PATENT DOCUMENTS 8,768,537 B2   7/2014  Kim et al.
9,036,509 B1   5/2015  Addepalli et al.
(Continued)

FOREIGN PATENT DOCUMENTS

CN    102487405 A    6/2012
CN    102576348 A    7/2012
(Continued)

OTHER PUBLICATIONS

Paul Baltusis, "2004-21-0009 On Board Vehicle Diagnostics", Oct. 18, 2004, 2004 Convergence Transportation Electronics Association, 15 pages, United States.
(Continued)

*Primary Examiner* — Michael V Kerrigan
(74) *Attorney, Agent, or Firm* — Schwabe, Williamson & Wyatt, P.C.

(57) ABSTRACT

Systems, apparatus, and computer-readable media for verifying operations of vehicle control systems are disclosed. During a test cycle, a processor may monitor control modules and/or sensors embedded in a vehicle for control system data, may generate and report fingerprint based on a combination of the control system data, and may report the fingerprint to a remote computing device. During deployment, the processor may monitor the control modules/sensors for control system data, may generate and performance results based on a combination of the control system data, and may report the performance results to the processor. The process may verify whether the control systems of the vehicle are operating as desired based on a comparison of the performance results with the fingerprint. The remote computing device may generate and send an alert or flag to a remote device if the control systems of the vehicle are not operating as desired.

20 Claims, 6 Drawing Sheets

Related U.S. Application Data continuation of application No. 15/482,075, filed on Apr. 7, 2017, now Pat. No. 10,269,192.

(51) Int. Cl.
*B60R 16/023* (2006.01)
*G01S 19/42* (2010.01)
*F02D 41/24* (2006.01)

(52) U.S. Cl.
CPC ........ *G07C 5/0841* (2013.01); *F02D 41/2487* (2013.01); *G01S 19/42* (2013.01)

(56) References Cited

U.S. PATENT DOCUMENTS

| | | |
|---|---|---|
| 9,503,902 B1 | 11/2016 | Coney |
| 9,644,559 B2 | 5/2017 | Pedro et al. |
| 9,697,652 B2 | 7/2017 | Lennevi et al. |
| 9,772,839 B2 | 9/2017 | Hong |
| 9,800,413 B2 | 10/2017 | Alrabady et al. |
| 9,830,750 B2 | 11/2017 | Ryu et al. |
| 9,938,916 B2 | 4/2018 | Giovaresco et al. |
| 10,039,097 B2 | 7/2018 | Polehn et al. |
| 10,055,217 B2 | 8/2018 | Hong |
| 10,157,050 B2 | 12/2018 | Kotani et al. |
| 10,180,835 B2 | 1/2019 | Hong |
| 10,269,192 B2 | 4/2019 | Garrett et al. |
| 10,776,098 B2 | 9/2020 | Hong |
| 2003/0076221 A1 | 4/2003 | Akiyama et al. |
| 2003/0117982 A1 | 6/2003 | Minnick |
| 2003/0184158 A1 | 10/2003 | Fuehrer |
| 2003/0216889 A1 | 11/2003 | Marko et al. |
| 2004/0138790 A1 | 7/2004 | Kapolka et al. |
| 2004/0167689 A1 | 8/2004 | Bromley et al. |
| 2005/0050017 A1 | 3/2005 | Ross et al. |
| 2005/0143879 A1 | 6/2005 | Yasuda |
| 2006/0194566 A1 | 8/2006 | Oesterling |
| 2007/0005609 A1 | 1/2007 | Breed |
| 2007/0288134 A1 | 12/2007 | Rollinger et al. |
| 2008/0007120 A1 | 1/2008 | Weyl et al. |
| 2009/0291637 A1 | 11/2009 | Alrabady et al. |
| 2010/0178872 A1 | 7/2010 | Alrabady et al. |
| 2012/0208461 A1 | 8/2012 | Choi et al. |
| 2013/0114446 A1 | 5/2013 | Liu et al. |
| 2013/0238165 A1 | 9/2013 | Garrett et al. |
| 2013/0304308 A1 | 11/2013 | Maruyama et al. |
| 2014/0100074 A1 | 4/2014 | Chutorash et al. |
| 2014/0179274 A1 | 6/2014 | O'Meara et al. |
| 2014/0244104 A1 | 8/2014 | Tan |
| 2015/0082297 A1 | 3/2015 | Parry et al. |
| 2015/0215738 A1 | 7/2015 | Frusina et al. |
| 2016/0078690 A1* | 3/2016 | Lennevi .............. B60L 7/26 701/33.6 |
| 2016/0117928 A1 | 4/2016 | Hodges et al. |
| 2016/0203651 A1 | 7/2016 | Heath et al. |
| 2016/0222890 A1 | 8/2016 | Luehrsen et al. |
| 2016/0335073 A1 | 11/2016 | Hong |
| 2017/0315797 A1 | 11/2017 | Vangelov |
| 2017/0357499 A1 | 12/2017 | Hong |
| 2018/0293816 A1 | 10/2018 | Garrett et al. |
| 2018/0307477 A1 | 10/2018 | Hong |
| 2019/0243632 A1 | 8/2019 | Hong |

FOREIGN PATENT DOCUMENTS

| | | |
|---|---|---|
| CN | 103079174 A | 5/2013 |
| CN | 103269520 A | 8/2013 |
| CN | 103814588 A | 5/2014 |
| CN | 105122029 A | 12/2015 |
| CN | 105892442 A | 8/2016 |
| CN | 106368832 A | 2/2017 |
| JP | 2001306133 A | 11/2001 |
| JP | 2002322935 A | 11/2002 |
| JP | 2003149086 A | 5/2003 |
| JP | 2004135179 A | 4/2004 |
| JP | 2004519060 A | 6/2004 |
| JP | 2015079440 A | 4/2015 |
| JP | 2016038634 A | 3/2016 |
| WO | 2011047056 A1 | 4/2011 |
| WO | 2013039763 A1 | 3/2013 |
| WO | 2013184877 A2 | 12/2013 |
| WO | 2015024126 A1 | 2/2015 |
| WO | 2016038415 A1 | 3/2016 |
| WO | 2016183096 A1 | 11/2016 |
| WO | 2018187035 A1 | 10/2018 |

OTHER PUBLICATIONS

Idea.Popcount; "Dissecting SSL Handshake"; https://idea.popcount.org/2012-06-16-dissecting-ssl-handshake/; retrieved online Apr. 3, 2017; 6 Pages.

European Patetn Office, Rijswijk; International Search Report and Written Opinion, PCT/US2018/023625; dated Jul. 4, 2018; 24 pages.

* cited by examiner

US 11,847,871 B2

TECHNOLOGIES FOR VERIFYING CONTROL SYSTEM OPERATION

RELATED APPLICATIONS

This application is a continuation of U.S. patent application Ser. No. 16/352,711 filed on Mar. 13, 2019, which is a continuation of U.S. patent application Ser. No. 15/482,075 filed on Apr. 7, 2017, now U.S. Pat. No. 10,269,192, the contents of each of which are herein incorporated by reference in their entirety.

COPYRIGHT NOTICE

© 2017 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND

In order to limit or reduce air pollutants released by motor vehicles, many vehicle manufacturers are required to have exhaust emissions tested for pollutants prior to vehicle production and sale. A jurisdiction may enact or otherwise define an emission testing standards specifying protocols/procedures for testing the exhaust emissions for different types of engines or vehicles. The testing protocols are usually designed to accurately and realistically represent the range of conditions under which the vehicle or engine is expected to be operated. These tests are typically standardized by a regulatory agency and performed in federally commissioned testing labs using dynamometers ("dynos"), which are devices that simulate loading of either an engine (e.g., using an engine dyno) or a full powertrain (e.g., using a chassis dynamometer).

Most vehicles include catalytic converters, devices that limit or reduce emissions generated by internal combustion (e.g., gasoline) engines and compression combustion (e.g., diesel) engines. In many cases, a vehicle may include an engine management system (EMS) that may manage or control various systems of the vehicle/engine (e.g., a fuel injection system, an ignition or spark system, etc.) so that the catalytic converter limits/reduces the requisite amount of emissions delineated by the emissions testing standard. In order to pass most emissions tests, the EMS may control the fuel injection system and spark system in a way that does not optimize fuel consumption, and therefore, does not provide the best possible fuel economy for the vehicle. Typically, the optimal calibrations for emissions reduction and fuel economy happen at different air-to-fuel ratios and spark ignition points.

However, in some cases the EMS and/or vehicle components may not be calibrated for optimal emissions reduction due to aging of the components, component failure, etc. In some cases, the EMS may not be calibrated for optimal emissions reductions due to a faulty or buggy over-the-air software updates provisioned by the vehicle's manufacturer. This may result in the vehicle emissions being higher than the legally permitted levels.

SUMMARY OF THE EMBODIMENTS

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

Systems, apparatus, and computer-readable media for verifying operations of vehicle control systems are disclosed. Various embodiments are related to vehicle-embedded computer devices (VECD). According to various embodiments, during a testing cycle a VECD may monitor control modules and/or sensors embedded in a vehicle for control system data (CSD), may generate and report a "fingerprint" based on a combination of the CSD, and may report the fingerprint to a vehicle performance verification system (VPVS). During deployment or an operating cycle, the VECD may monitor the control modules/sensors for CSD, may generate performance results (PRs) based on a combination of the CSD, and may report the PRs to the VPVS. The VPVS may verify whether the control systems of the vehicle are operating as desired based on a comparison of the PRs with the fingerprint. The VPVS may report or alert a governmental regulator, vehicle manufacturer or fleet owner that the vehicle is not operating as desired if any discrepancies (within a standard deviation or reasonable degree of error) are detected between the FP and PRs.

In embodiments, the VECD may monitor for the control system data by obtaining the control system data from individual control modules or from a plurality of sensors embedded in the vehicle. In embodiments, the VECD may generate the performance results by determining, based on the obtained control system data, real-time operation parameters during the operating cycle matching the operation parameters defined by the vehicle emissions test procedure. The VECD may generate the performance report to include data items of the obtained control system data corresponding to the real-time operation parameters collected during the operating cycle.

In embodiments, the data items of the obtained control system data may comprise real-time calculated or measured intake air temperature (IAT) data of IAT sensors of the plurality of sensors; real-time calculated engine load values from an engine control module (ECM), the ECM being among the individual control modules; real-time fuel injector activation timing data of the one or more cylinders or the one or more injectors from the ECM; ignition spark timing data of the one or more cylinders from the ECM, wherein the ignition spark timing data indicates spark events relative to crank angle of the one or more cylinders; exhaust sensor data of exhaust sensors of the plurality of sensors relative to fuel injection timing events of the fuel injector activation timing data, wherein the exhaust sensors include the exhaust oxygen sensors and manifold absolute pressure (MAP) sensors of the plurality of sensors; and/or other types of data.

In embodiments, the VECD may identify another trigger to monitor for other control system data during a testing cycle, and may monitor for the other control system data in response to detection of the other trigger. The VECD may generate a vehicle fingerprint based on a combination of the monitored other control system data, and may transmit another message including the vehicle fingerprint to the VPVS.

In embodiments, the other control system data may be obtained from the individual control modules and the plurality of sensors, and the combination of other control system data of the vehicle fingerprint may comprise exhaust oxygen data from exhaust oxygen sensors of the plurality of sensors; engine revolutions per minute (RPM) of an engine of the vehicle from an ECM, the ECM being among the individual control modules; fuel injector activation timing data of one or more cylinders or one or more injectors of the engine from the ECM; ignition spark timing data of the one or more cylinders from the ECM; intake air flow data from mass air flow (MAF) sensors of the plurality of sensors; and/or other types of data.

In embodiments, the VECD may receive a command to roll back a software update of a control system configuration when the VECD is not verified as operating according to desired performance parameters; obtain a desired version of the control system configuration based on the command; and implement the desired version of the control system configuration.

In various embodiments, the VECD may comprise at least one memory device and at least one processor communicatively coupled with a communications system and the individual control modules by way of a controller area network (CAN), a Time-Trigger Protocol (TTP) system, or a FlexRay system. In embodiments, the communications system may be configured to transmit a message including the performance results to the VPVS.

Various embodiments are related to computer systems for implementing a VPVS. According to various embodiments, a computer system implementing a VPVS may comprise a processor and a network interface. The network interface may be configured to receive, from a VECD, a message including performance results of a vehicle in which the VECD is embedded. The performance results may be based on data collected by individual control modules embedded in the vehicle. The network interface may be configured to transmit a flag to another computer device when the performance results indicate that the VECD is not operated according to desired performance parameters. The processor may be configured to compare data items of the performance results with data items of a vehicle fingerprint of the vehicle. The vehicle fingerprint may be based on a combination of control system data collected during a vehicle emissions test. The vehicle emissions test may be conducted according to a vehicle emissions test procedure that defines operation parameters during which control system data is to be collected. The processor may be configured to generate the flag when at least one data item of the performance results varies from a corresponding data item of the vehicle fingerprint by a threshold.

In embodiments, the network interface may be configured to obtain the vehicle fingerprint from a vehicle repository. In embodiments, the processor may be configured to generate a timestamp of when the data items of the performance results are compared with data items of a vehicle fingerprint; and may be configured to generate historical data including the timestamp and the flag. In embodiments, the network interface may be configured to send the vehicle historical data to the vehicle repository for storage. In embodiments, the network interface may be configured to send the performance results to a vehicle repository for storage in association with the fingerprint.

In embodiments, the historical data may indicate a difference between one or more data items of the performance results and one or more data items of the vehicle fingerprint. In embodiments, the historical data may indicate a difference between a desired air-to-fuel ratio and an actual air-to-fuel ratio. In embodiments, the historical data may indicate a difference between a desired spark timing and an actual spark timing.

Additional aspects and advantages of this invention will be apparent from the following detailed description of preferred embodiments, which proceeds with reference to the accompanying drawings.

BRIEF DESCRIPTION OF THE DRAWINGS

The included drawings are for illustrative purposes and serve to provide examples of possible structures and operations for the disclosed embodiments. The drawings in no way limit any changes in form and detail that may be made by one skilled in the art without departing from the spirit and scope of the disclosed concepts.

FIG. 5a shows an example process for generating and reporting fingerprint data in accordance with various embodiments, and FIG. 5b shows an example process for generating and reporting performance results in accordance with various embodiments.

FIG. 6a shows an example process for obtaining fingerprint data in accordance with various embodiments, and FIG. 6b shows an example process for configuring a VECD in accordance with various embodiments.

DETAILED DESCRIPTION

Figure 1:
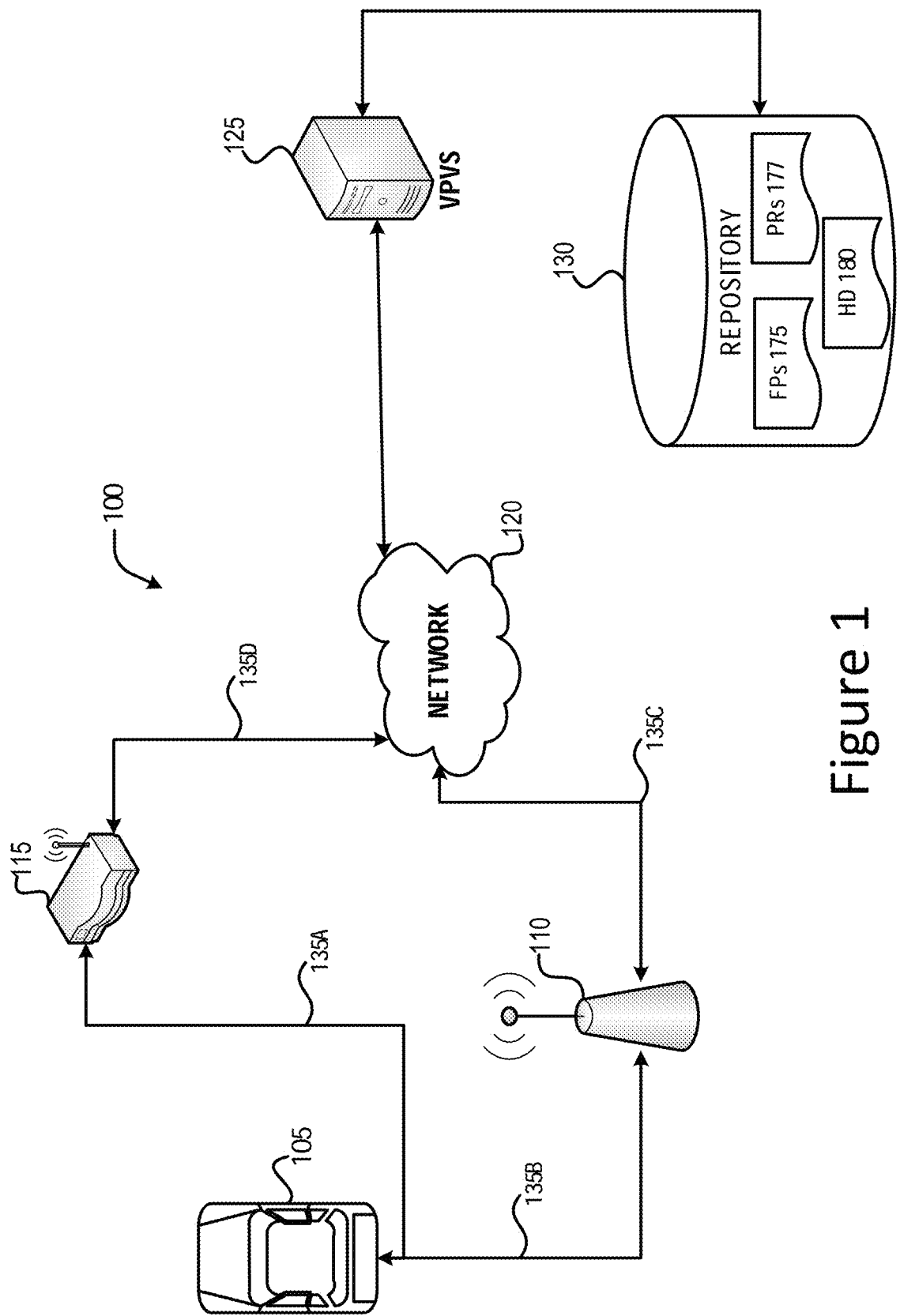
FIG. 1 illustrates an environment in which various embodiments may be practiced.

Examples of systems, apparatus, computer-readable media, and methods according to the disclosed embodiments are described in this section. The various examples are being provided solely to add context and aid in the understanding of the disclosed embodiments, and should be apparent to one skilled in the art that the disclosed embodiments may be practiced without some or all of the specific details provided. For purposes of explanation and not limitation, specific details are set forth such as particular structures, architectures, interfaces, techniques, etc., in order to provide a thorough understanding of the various aspects of the disclosed embodiments. In some cases, certain implementation details have not been described in detail in order to avoid unnecessarily obscuring the disclosed embodiments. Other implementations and applications also are possible, and as such, the following examples should not be taken as definitive or limiting in scope.

In the following description, references are made to the accompanying drawings, which form a part of the description and in which are shown, by way of illustration, example embodiments. Although these disclosed embodiments are described in sufficient detail to enable one skilled in the art to practice the embodiments, it is to be understood that these examples are not limiting, such that other implementations may be used and changes may be made to the disclosed embodiments without departing from their spirit and scope.

Some example embodiments may be described as a process depicted in one or more figures as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

The description may use the phrases "in an embodiment," "in embodiments," "in some embodiments," and/or "in various embodiments," which may each refer to one or more of the same or different embodiments. The terms "comprising," "including," "having," and the like, as used with respect to embodiments of the present disclosure, are synonymous unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B).

Embodiments discussed herein relate to methods, systems, and computer-readable media for verifying the operation of control systems, and in particular to verifying the operation of vehicle control systems used for regulating exhaust emissions. When a vehicle is tested for emissions prior to being sold, a vehicle-embedded computer device (VECD) may record various control system data in order to create a vehicle fingerprint of the control system data variables and calibration data as they pertain to an emissions testing cycle and/or emissions standards promulgated by a regulatory agency or other like governing body. The fingerprint may be generated during an emissions test performed in testing lab using a dynamometer ("dyno"). The VECD may provide the fingerprint to a vehicle performance verification system (VPVS), which may be operated by the regulatory agency (or a private entity that is contracted to perform emissions testing).

After the vehicle is deployed (e.g., sold and operated by an end-user on public roads), the VECD may monitor for control system data during operation. During operation, the driving conditions that are simulated by the emissions testing cycle may be reproduced in real-time by the operator of the vehicle. In embodiments, the VECD may poll, on a periodic basis, various control modules embedded in the vehicle for the control system data, or the VECD may obtain the control system data from various control modules when various criteria or conditions are met (e.g., such as conditions that are delineated by a emissions standard). The VECD may then generate performance results based on a combination of the monitored control system data, and provide the performance results to the VPVS.

The VPVS may compare data items of the performance results with data items of the fingerprint or other historical data to determine whether the vehicle is operating in a same or similar manner as during the emissions testing cycle. In embodiments, the VPVS may determine any degree a variance (e.g., a standard deviation, a specified margin of error, and/or other like threshold value) between the performance results and the control system data recorded during the emissions testing cycle. In embodiments, if the VPVS determines that the VECD is operating outside of a specified degree of variability, then the VPVS may generate an alert, flag, or other like indication that the vehicle is not operating as desired, and the VPVS may send the alert/flag/indication to a governmental body, vehicle manufacturer, and/or other like entities. Other embodiments may be described and/or claimed.

Referring to the figures, FIG. 1 illustrates an environment 100 in which various embodiments may be practiced. Environment 100 includes a vehicle 105, a base station (BS) 110, a gateway (GW) 115, a network 120, a vehicle performance verification system (VPVS) 125, and a repository 130. For illustrative purposes, the following description is provided deployment scenarios including vehicles 105 in a two dimensional (2D) freeway/highway/roadway environment wherein the vehicle 105 is implemented as an automobile. However, the embodiments described herein are also applicable to trucks, busses, motorcycles, motorboats, and/or any other motorized devices capable of transporting people or goods. The embodiments described herein may also be applicable to three dimensional (3D) deployment scenarios where the vehicles 105 are implemented as flying objects, such as aircraft, drones, unmanned aerial vehicles (UAVs), and/or to any other like motorized devices.

The vehicle 105 may be any type of motorized vehicle or device used for transportation of people or goods, which may be equipped with controls used for driving, parking, passenger comfort and/or safety, etc. The terms "motor", "motorized", etc. as used herein may refer to devices that convert one form of energy into mechanical energy, and may include internal combustion engines (ICE), compression combustion engines (CCE), electric motors, and hybrids (e.g., including an ICE/CCE and electric motor(s)). Although FIG. 1 shows only a single vehicle 105, the vehicle 105 may represent a plurality of individual motor vehicles of varying makes, models, trim, etc., which may be collectively referred to as "vehicle 105."

The vehicle 105 may be propelled by an ICE that burns gasoline (also known as petrol) or a CCE that burns diesel fuel. Burning of both types of fuel may produce emissions that cause air pollution and are also blamed for contributing to climate change and global warming. These emissions may include, inter alia, Hydro Carbons (HC), nitrogen oxides ($2NO_x$), and carbon monoxide ($2CO$). The amounts or levels of emissions that are permitted to be released into the atmosphere may be regulated by a governmental body or regulatory agency. The vehicle 105 may also include a catalytic converter, which is an emissions control device that converts toxic gases and pollutants in exhaust gas into less toxic pollutants by catalyzing a redox reaction. For example, the catalytic converter may convert unburnt HCs into $CO_2$ and water via oxidation; convert $2NO_x$ into Nitrogen and Oxygen via a chemical reduction process; and $2CO$ into $CO_2$ via oxidation. The particular type of catalytic converter used may be implementation specific (e.g., engine type, make, model, trim, etc. of the vehicle 105).

In various embodiments, the vehicle 105 may include a vehicle-embedded computer device (VECD) (e.g., VECD 300 shown and described with regard to FIG. 3) that may be used to monitor and control various control modules of the vehicle to ensure optimal performance of the vehicle 105. As used herein, the term "vehicle-embedded computer device" or "VECD" may be considered synonymous to, and may include any type of computer device used to control one or more systems of a vehicle, such as an electronic/engine control unit, electronic/engine control module, embedded system, microcontroller, control module, engine management system (EMS), onboard diagnostic (OBD) devices, dashtop mobile equipment (DME), mobile data terminals (MDTs). Additionally, the VECD may also include wireless phones or smartphones, laptops, tablet computer devices, wearable computer devices, machine type communication (MTC) devices, Internet of Things (IoT) devices, and/or any other physical device capable of recording, storing, and/or transferring digital data to/from other computer devices.

The control modules may be electronic/engine control units (ECUs), electronic/engine control module (ECM) or other like embedded computer device that controls one or more electrical systems of vehicle 105. As used herein, the terms "electronic control unit", "engine control unit", "ECU", "engine control module", "electronic control module", or "ECM" may be interchangeable with the term "control module." The VECD and/or the ECUs may obtain sensor data from one or more sensors embedded in the vehicle 105, interpret the sensor data using multidimensional performance maps or lookup tables, and control electro-mechanical devices (e.g., actuators, etc.) to adjust or alter the performance of corresponding systems. Examples of these systems include, inter alia, a fuel injection system operated by an engine control module (ECM) to control the air-to-fuel ratio (AFR) to the cylinders of the vehicle's 105 engine and/or the engine's revolutions per minute (RPMs); a transmission system operated by a transmission control unit (TCU) to control, for example, a transmission gear ratio; variable valve timing systems; and the like.

In embodiments, the VECD may include one or more processors and/or memory devices that may be configured to carry out various functions according to the various embodiments discussed here. For example, the VECD may execute instructions stored in a computer-readable medium, or may be pre-configured with the logic (e.g., with appropriate bit streams, logic blocks, etc.) to monitor or otherwise obtain control system data from one or more ECUs during an emissions test cycle; generate a fingerprint (FP) 175 based on a combination of the control system data obtained during the emissions test cycle; monitor or otherwise obtain control system data from one or more ECUs during an operating cycle; and generate performance results (PRs) 177 based on a combination of the obtained control system data.

Figure 3:
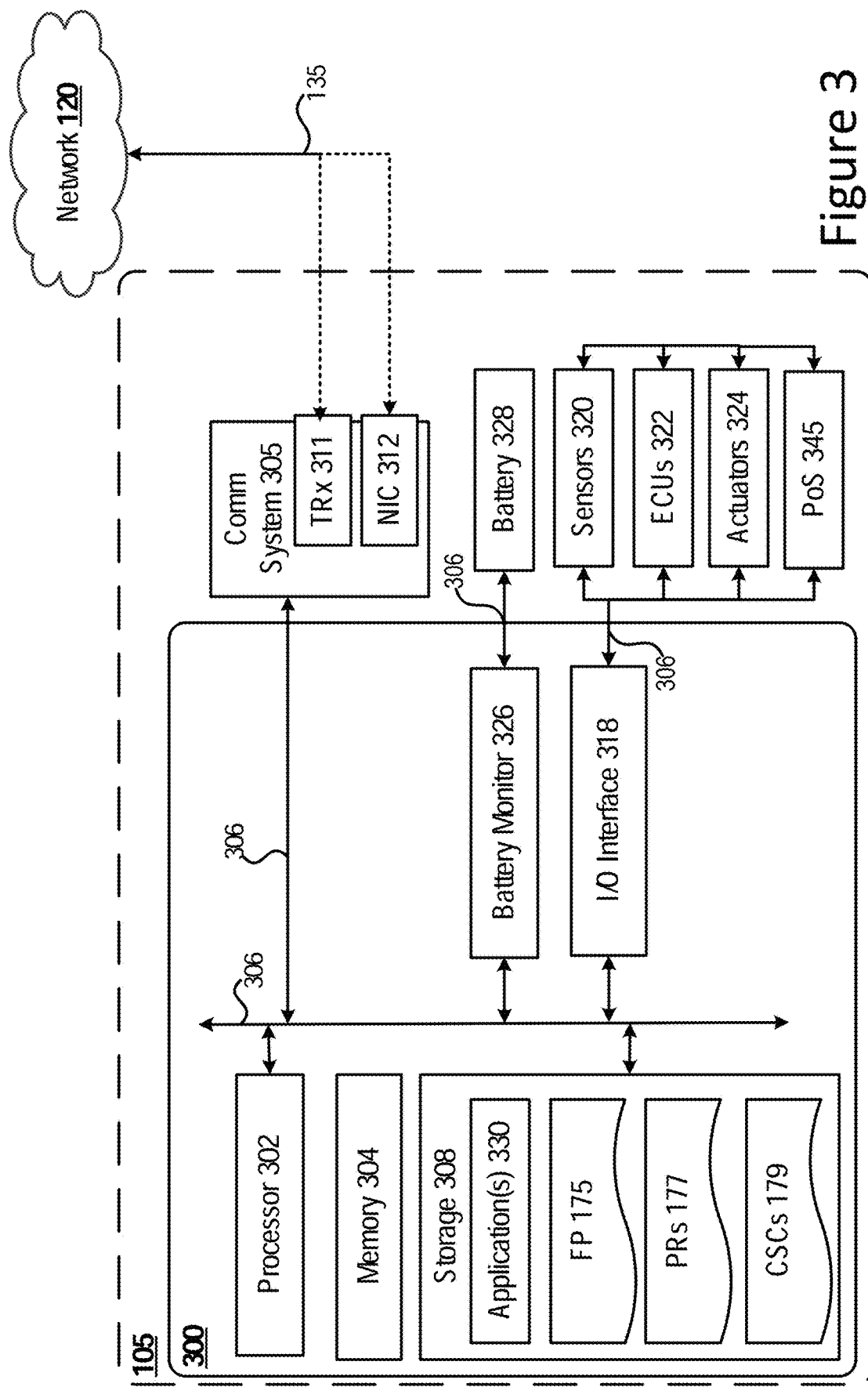
FIG. 3 illustrates an example implementation of a vehicle-embedded computer device (VECD), in accordance with various embodiments.

In embodiments, the VECD may also include, or operate in conjunction with a communications system (e.g., communications system 305 shown and described with regard to FIG. 3) in order to carry out the various embodiments discussed herein, such as by communicating with one or more remote devices (e.g., vehicle performance verification system (VPVS) 125, etc.) in accordance with one or more wireless communications protocols and/or one or more wired communications protocols. For example, the communications system may transmit a first message including the FP 175 to VPVS 125 via network 120; and may transmit, to the VPVS 125, a second message including PRs 177.

The communications system of the vehicle 105 may communicate with the VPVS 125 via the BS 110 or the GW 115. The BS 110 may be one or more hardware computer devices configured to provide wireless communication services to mobile devices (for example, VECD in vehicle 105) within a coverage area or cell associated with the BS 110. The BS 110 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link (e.g., link 135B). Furthermore, one or more network interface controllers may be configured to transmit/receive with another BS (not shown) and/or GW 115 over a backhaul connection (not shown) and may communicate with the network 120 and the VPVS 125 over backhaul connection 135C.

As an example, the BS 110 may be a base station associated with a cellular network (e.g., an evolved NodeB (eNB) in an LTE network, a next generation nodeB (gNB) in a new radio access technology (NR) network, a WiMAX base station, etc.), roadside unit (RSU), a remote radio head, a relay radio device, a smallcell base station (e.g., a femtocell, picocell, home evolved nodeB (HeNB), and the like), or other like network element. In embodiments, the VECD may generate an FP 175 and/or PRs 177 during operation of the vehicle 105, and may transmit the data to the BS 110 over link 135B, and the BS 110 may provide the data to the VPVS 125 via network 120 over backhaul link 135C. In addition, the VPVS 125 may send data (e.g., an alert/flag or instruction to re-enable a previous control system configuration, etc.) to the VECD of the vehicle 105 via the backhaul link 135C and link 135B. In various embodiments, the VECD in the vehicle 105 may communicate with the VPVS 125 via the BS 110 during operation of the vehicle 105 in accordance with one or more wireless communications protocols as discussed herein. The term "link" as used herein may refer to any transmission medium, either tangible or intangible, which is used to communicate data. The term "link" may be synonymous with and/or equivalent to "channel," "tunnel," "data link," "sidelink," "carrier," "radiofrequency carrier," and/or any other like term denoting a pathway or medium through which data is communicated.

The GW 115 may be a network element that may provide communication services to network-enabled motor vehicles (e.g., vehicle 105), non-network-enabled vehicles, and/or other like devices in a given environment. In this way, GW 115 may act as a single point of contact between devices that are unable to directly connect to larger networks (e.g., network 120) and remote computer devices (e.g., VPVS 125). The GW 115 may include one or more processors, communications systems (e.g., including network interface controllers, one or more transmitters/receivers connected to one or more antennas, and the like), and computer readable media. In embodiments, the GW 115 may be a wireless access point (WAP), a home/business server (with or without radio frequency (RF) communications circuitry), a small cell base station (e.g., a femtocell, picocell, HeNB, and the like), a router, a switch, a hub, a radio beacon, and/or any other like network device.

The GW 115 may be used to provide vehicle FPs 175 and/or PRs 177 from VECD of vehicle 105 in embodiments where the vehicle 105 lacks the ability to wirelessly communicate with remote devices, such as when the vehicle 105 does not include a communications system. In such embodiments, a network interface controller of the GW 115 may be configured to connect with the VECD via a communications port to communicate data with the VECD using a wired connection (e.g., link 135A). In some scenarios, another computer device, such as a laptop personal computer (PC), a tablet computer device or smartphone, etc. may connect with the VECD using a serial or USB cable, which may then be used to communicate with the GW 115 via a wired or wireless connection. The network interface controller may also transmit/receive data to/from VPVS 125 via network 120 using another wired connection (e.g., link 135D). The GW 115 may process and/or route data packets over the wired connection according to one or more communications protocols discussed herein.

Additionally or alternatively, the GW 115 may allow the VECD and VPVS 125 to communicate with one another in embodiments where the VECD or vehicle 105 includes a communications system but is unable to communicate with VPVS 125 via BS 110. Such scenarios may include, for example, when a user of vehicle 105 does not have a cellular subscription plan or when the user's data plan runs out; when the vehicle 105 operates in an area with little to no cellular coverage (e.g., a rural area); when the vehicle 105 is unable to communicate with BS 110 due to network congestion or other like network-based failures; etc. In such embodiments, the VECD may communicate with the GW 115 in a same or similar manner as discussed previously with regard to the BS 110. Additionally or alternatively, one or more transmitters/receivers (or transceivers) of the GW 115 may be configured to wirelessly transmit/receive RF signals to/from the VECDs over a radio link (e.g., link 135A), and the network interface controller may be configured to transmit/receive data to/from VPVS 125 via network 125 using a wired connection (e.g., link 135D). The GW 115 may process and/or route data packets over the wired connection according to one or more communications protocols discussed herein.

In some scenarios, by the GW 115 and the BS 110 may be utilized to provide communications between vehicle 105 and VPVS 125. For example, the GW 115 may be deployed in a laboratory or an emissions testing facility and used to provide an FP 175 to the VPVS 125, and the BS 110 may be used to provide PRs 177 to the VPVS 125 when the vehicle 105 is operating at large, for example when deployed on public roads.

The network 120 may represent the Internet, one or more cellular networks, a local area network (LAN) or a wide area network (WAN) including proprietary and/or enterprise networks for a company or organization, or combinations thereof. Network 120 may include a Transfer Control Protocol (TCP)/Internet Protocol (IP)-based network, such as the Internet. Components used for such communications system can depend at least in part upon the type of network and/or environment selected. Protocols and components for communicating via such networks are well known and will not be discussed herein in detail. However, it should be appreciated that network 120 may be associated with network operator who owns or controls network equipment and other elements necessary to provide network-related services, such as one or more base stations or access points, and one or more servers for routing digital data or telephone calls (for example, a core network or backbone network).

The VPVS 125 may comprise one or more hardware computer devices and/or network elements (e.g., servers) for providing one or more services for various computer devices. These services may utilize the data captured and reported by the VECD in vehicle 105. The VPVS 125 may obtain event based data from the VECD, analyze the event-based data, and may be able to generate content to be transferred to the VECD in the form of HyperText Markup Language (HTML), Extensible Markup Language (XML), JavaScript Object Notation (JSON), ColdFusion Markup Language (CFML), and/or any other appropriate structured language. The VPVS may generate the content using PHP, ASP.NET, ColdFusion, and/or some other suitable server-side scripting language. The handling of requests and responses, (e.g., requests for information/content and the information/content provided in response) may be handled by the web server (not shown). In various embodiments, the VPVS 125 may be implemented as a cloud computing service or broker system (also referred to as a "cloud broker", "cloud service provider", and the like) that provides one or more users/entities with the ability to log-in and manage an array of VECDs across one or more vehicles 105 using a dashboard or other like user interface. The users/entities may use the dashboard or other like user interface to view vehicle performance data, including VECD flags/alerts, and/or other like data associated with a plurality of VECDs and/or vehicles 105. In embodiments, such entities may include one or more governmental agencies or regulators that monitor vehicle emissions, or the entities may include customers (e.g., vehicle manufacturers and/or sellers) that employ a private entity (e.g., an operator of the VPVS 125) to perform emissions monitoring.

The VPVS 125 may include an operating system (OS) that may provide executable program instructions for the general administration and operation of servers, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. In embodiments, the VPVS 125 may include one or more processors and/or memory devices that may be configured to carry out various functions according to the various embodiments discussed here. For example, the VPVS 125 may execute instructions stored in a computer-readable medium, or may be pre-configured with the logic (e.g., with appropriate bit streams, logic blocks, etc.) to compare data items of the PRs 177 with data items of a vehicle FP 175 of the vehicle 105; and generate a message including a flag or alert when at least one data item of the PRs 177 varies from a corresponding data item of the vehicle FP 175 by a threshold amount, standard deviation, etc. (within a predefined margin of error). The VPVS 125 may also generate and store historical data (HD) 180 indicating a time/date that the VECD of the vehicle 105 was verified or not verified. In embodiments, the VPVS 125 may also access other types of data from various sources in order to determine the variance between the FP 175 and PRs 177. Such data may include weather condition data, road condition data, traffic reports for a geographic area, and the like.

The VPVS 125 may comprise a single physical hardware device, or may be physically or logically connected with other network devices, such that the VPVS 125 may reside on one or more physical hardware devices. Moreover, the VPVS 125 may be connected to, or otherwise associated with, one or more data storage devices, such as repository 130.

Repository 130 may include one or more storage devices that store FPs 175, PRs 177, and HD 180 in one or more database objects. The data storage devices may include at least one of a primary storage device, a secondary storage device, a tertiary storage device, a non-linear storage device, and/or other like data storage devices. The repository 130 may implement a relational database management system (RDBMS), an object database management system (ODBMS), or the equivalent to execute storage and retrieval of information against the database object(s). The repository 120 can be implemented as part of a single database, a distributed database, a collection of distributed databases, a database with redundant online or offline backups or other redundancies, etc., and can include a distributed database or storage network. The VPVS 125 may utilize any suitable query language to store and retrieve information in/from the repository 130. Suitable implementations for the database systems and storage devices are known or commercially available, and are readily implemented by persons having ordinary skill in the art.

The repository 130 may store a database object, or fields, records, and data elements within a database object for corresponding vehicle 105. The database objects may include the FPs 175, PRs 177, and HD 180 associated with vehicle 105, as well as other information/data associated with vehicle 105. For example, such additional information may include a vehicle identification number (VIN) of vehicle 105 or other like a globally unique identifiers (IDs); authentication credentials (e.g., user ID/password; key information, digital signatures, digital certificates, etc.); timestamps of when FPs 175, PRs 177, and/or HD 180 are generated and/or obtained; location information (e.g., geographic coordinates, etc.) of where the FPs 175, PRs 177, and/or HD 180 are generated and/or obtained; individual VECD and/or ECU IDs or fingerprints; control system configurations (CSC) implemented by a particular vehicle 105 with related information (e.g., version number, developer name and/or ID, timestamp of installation, etc.); OTA software updates (e.g., CSC updates, etc.) implemented by a particular vehicle 105 with related information (e.g., version number, developer name and/or ID, timestamp of installation, etc.); and/or other like IDs or information.

The FPs 175 may be records, data points, database elements, or other like collection of data items relating to performance of a vehicle 105 during a testing cycle, such as an emissions test cycle. In embodiments, the FPs 175 may be based on a combination of control system data collected during a vehicle emissions test (or test cycle), which may be legally defined testing protocol. The emissions test may be conducted according to a vehicle emissions test procedure that defines operation parameters during which control system data is to be collected. The emissions test procedure/protocol may be defined by an emissions standard promulgated by a regulatory agency or other like governmental body. As an example, an FP 175 may include one or more of the following data items: exhaust oxygen data provided by exhaust oxygen sensors of the vehicle 105; engine revolutions per minute (RPM) of an engine of the vehicle 105 provided by an engine control module (ECM), fuel injector activation timing data of one or more cylinders or one or more injectors of the engine provided by the ECM; ignition spark timing data of the one or more cylinders provided by the ECM; intake air flow data provided by mass air flow (MAF) sensors; intake air temperature (IAT) data provided by IAT sensors; ambient air temperature (AAT) data of AAT sensors of the plurality of sensors; ambient air pressure (AAP) data provided by AAP sensors; catalytic converter temperature (CCT) data provided by CCT sensors; catalytic converter oxygen (CCO) data provided by CCO sensors; transmission gear ratio data provided by the ECM and/or a TCU; vehicle speed data provided by a vehicle speed sensor (VSS), ECM, or TCU; exhaust gas recirculation (EGR) data provided by EGR pressure sensors and/or EGR position sensors. Furthermore, the FP 175 indicate points in time that the aforementioned data items were collected. The FP 175 may include more, less, and/or alternative types of data items than those listed previously.

The PRs 177 may be records, database elements, or other like collection of data items relating to performance of a vehicle 105 during an operational cycle (also referred to as an "operations cycle", "operating cycle", "driving cycle", and the like), such as when the vehicle 105 is operated or driven by an end-user. In embodiments, the PRs 177 may be based on a combination of control system data collected from one or more ECUs and/or sensors embedded in the vehicle 105 during an operating cycle of the vehicle 105. In embodiments, the PRs 177 may include the same or similar types of data as the FP 175, and/or may be in a same or similar format or data structure as the FP 175. Additionally or alternatively, data items of the PRs 177 may include real-time calculated or measured IAT data provided by the IAT sensors and/or ECU/ECM; real-time calculated engine load values provided by the ECU/ECM; real-time fuel injector activation timing data of the one or more cylinders or the one or more injectors provided by the ECM/ECU; ignition spark timing data of the one or more cylinders provided by the ECM/ECU, where the ignition spark timing data indicates spark events relative to crank angle of the one or more cylinders; exhaust sensor data provided by exhaust sensors relative to fuel injection timing events of the fuel injector activation timing data, where the exhaust sensors include exhaust oxygen sensors and/or manifold absolute pressure (MAP) sensors; AAT data provided by the AAT sensors; AAP data provided by the AAP sensors; CCT data provided by the CCT sensors; CCO data provided by the CCO sensors; transmission state data from the TCU or the ECM/ECU; and/or vehicle speed data provided by the VSS. The PRs 177 may include more, less, and/or alternative types of data items than those listed previously.

The HD 180 may be a collection of data that is indicative of operational performance of vehicle 105, various systems of the vehicle 105, and/or one or more ECUs implemented by the vehicle 105. In embodiments, the HD 180 may include values derived from a comparison between the FPs 175 and PRs 177, such as a difference between a desired air-to-fuel ratio (e.g., an air-to-fuel ratio indicated by an FP 175) and an actual air-to-fuel ratio (e.g., an air-to-fuel ratio indicated by PRs 177), and/or a difference between a desired spark timing (e.g., a spark timing indicated by an FP 175) and an actual spark timing (e.g., a spark timing indicated by PRs 177). In embodiments, the HD 180 may include one or more alerts, flags, etc. that were previously generated by the VPVS 125 based on the variance between the FP 175 and PRs 177 for vehicle 105, if such alerts/flags/etc. were generated. The HD 180 may also include timestamps and other like information about the alerts/flags/etc. In some embodiments, the HD 180 may include information regarding the number of times and timestamps when the VECD of vehicle 105 has been verified.

Figure 2:
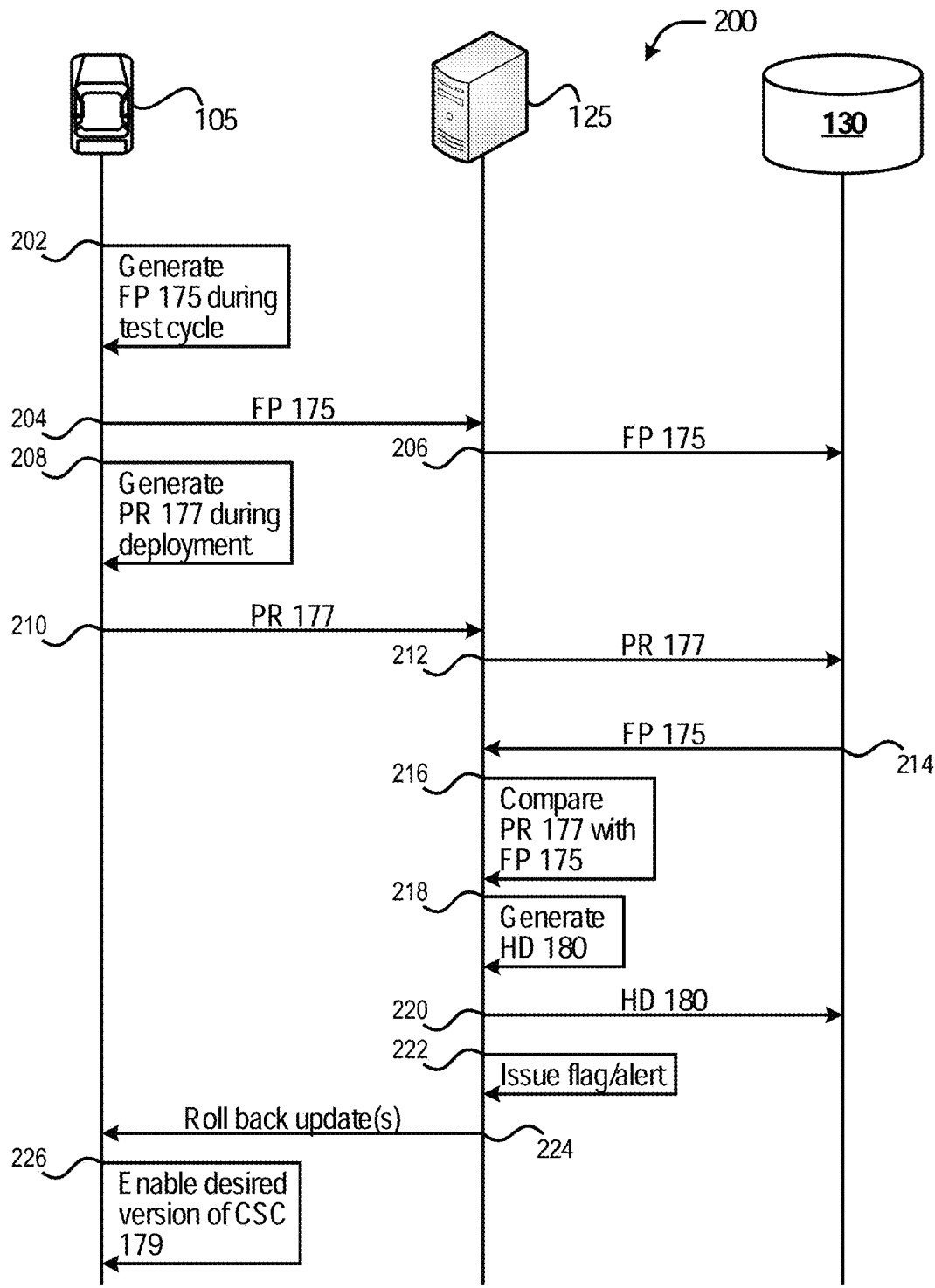
FIG. 2 illustrates a process for verifying operation of a control system of a vehicle in the environment of FIG. 1.

FIG. 2 illustrates a process 200 for verifying operation of a control system of vehicle 105 performed by various elements of environment 100 of FIG. 1. For illustrative purposes, the operations of process 200 are described as being performed by the vehicle 105, the VPVS 125, and repository 130. Although not shown by FIG. 2, the vehicle 105, the VPVS 125, and repository 130 may communicate with one another over links 135 and/or network 120 according to embodiments discussed herein.

Process 200 may begin at operation 202 where the VECD of vehicle 105 may generate an FP 175 during a testing cycle, such as an emissions test cycle. The testing cycle may be performed in a lab or any suitably controlled environment. At operation 204, the VECD of vehicle 105 may provide the FP 175 to the VPVS 125, and at operation 206 the VPVS 125 may store the FP 175 in the repository 130.

After some time the vehicle 105 may be deployed and used by an end user. During deployment, the VECD of vehicle 105 at operation 208 may generate PRs 177, and at operation 210, the VECD of vehicle 105 may send the PRs 177 to the VPVS 125, which may be stored in the repository 130 at operation 212.

In response to receipt of the PRs 177, at operation 214 the VPVS 125 may retrieve the FP 175 from the repository 130, and at operation 216 the VPVS may perform a data comparison between data items in the PR 177 and data items in the FP 175 to determine if any of the data items in the PR 177 vary (within a standard deviation or margin of error) from the FP 175.

If at operation 216 the VPVS 125 determines that there are not any data items in the PR 177 that are substantially different than the data items in FP 175, then the VPVS 125 may, at operation 218, generate HD 180 indicating that the vehicle 105 passed the verification procedure and store the HD 180 in the repository 130 at operation 220. The VPVS 125 may then end or repeat process 200 by monitoring or waiting for receipt of additional PRs 177 from the vehicle 105.

If the VPVS 125 determines that there are data items in the PR 177 that are substantially different than the data items in FP 175, then at operation 218 the VPVS 125 may, at operation 218, generate a HD 180 indicating that the vehicle 105 did not pass the verification procedure and may store the HD 180 in the repository 130 at operation 220. At operation 222, the VPVS 125 may issue a flag/alert indicating the performance variance of vehicle 105. In embodiments, the flag/alert may be generated at operation 218 as part of the HD 180 and stored in repository 130 at operation 220. In other embodiments, the flag/alert may be generated at operation 222 and subsequently stored in repository 130 in association with the HD 180.

In some embodiments, at operation 224 the VPVS 224 may send an instruction to the VECD 300 to roll back software update(s), and at operation 226, the VECD 300 may enable a desired version of a CSC 179. Operations 224 and 226 may be performed in embodiments where an over-the-air (OTA) update was applied to the VECD 300 prior to performance of the verification process 200. In alternate embodiments, at operation 222 the VPVS 125 may issue the flag/alert to separate authorized entity that is responsible for configuring the control systems of the vehicle 105. In such embodiments, operation 224 may be performed by the separate authorized entity. After operations 216-226 are performed, process 200 may end or repeat as necessary.

FIG. 3 illustrates an example implementation of a VECD 300, in accordance with various embodiments. FIG. 3 shows a block diagram of an example of components that may be present in a vehicle 105 and a VECD 300. The VECD 300 may include any combinations of the components shown FIG. 2. The components may be implemented as integrated circuits (ICs) or portions thereof, discrete electronic devices, or other modules, logic, hardware, software, firmware, middleware or a combination thereof adapted in the VECD 300, or as components otherwise incorporated within a chassis of a larger system.

The VECD 300 may be an embedded system or other like computer device that is used to control one or more systems of vehicle 105. For example, the VECD 300 may be an Electronic Engine Management System (EEMS) or an ECU as discussed herein. The VECD 300 may include a processor 302 may be one or more processing elements configured perform basic arithmetical, logical, and input/output operations by carrying out instructions. The processor 302 may be one or more microprocessors, one or more single-core processors, one or more multi-core processors, one or more multithreaded processors, one or more ultra-low voltage processors, one or more embedded processors, one or more digital signal processors (DSPs), one or more FPDs (hardware accelerators) such as FPGAs, structured ASICs, programmable SoCs (PSoCs), etc., and/or other processor or processing/controlling circuit. The processor 302 may be a part of a system on a chip (SoC) in which the processor 302 and other components discussed herein are formed into a single IC or a single package.

In some embodiments, the processor 302 may include a sensor hub, which may act as a coprocessor by processing data obtained from the sensors 322. The sensor hub may include one or more processors that are the same or similar to those discussed herein that are configured to integrate data obtained from each of the sensors 322 by performing arithmetical, logical, and input/output operations. In embodiments, the sensor hub may capable of timestamping obtained sensor data, provide sensor data to the processor 302 in response to a query for such data, buffering sensor data, continuously streaming sensor data to the processor 302 including independent streams for each sensor 322, reporting sensor data based upon predefined thresholds or conditions/triggers, and/or other like data processing functions.

The system memory 304 may be circuitry configured to store data or logic for operating the VECD 300. Memory 304 may include number of memory devices may be used to provide for a given amount of system memory. As examples, the memory 304 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, antifuses, etc.) that may be configured in any suitable implementation as are known.

Where FPDs are used, the processor 302 and memory 304 (and/or data storage 308) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs), such as a provisioned CSC 179, that are used by the processor 302 to implement various logic functions. The memory cells may include any combination of various levels of memory/storage including, but not limited to, EPROM, EEPROM, flash memory, SRAM, antifuses, etc.

Data storage 308 may provide for persistent storage of information such as data, applications 330, FP 175, PRs 177, and CSCs 179, operating systems, etc. The data storage 308 may be implemented as a solid state disk drive (SSDD); flash memory cards, such as SD cards, microSD cards, xD picture cards, and the like, and USB flash drives; on-die memory or registers associated with the processor 302; a micro hard disk drive (HDD); resistance change memories; phase change memories; holographic memories; or chemical memories; among others. As shown, the data storage 308 is included in the VECD 300; however, in other embodiments, the data storage 308 may be implemented as a separate device that is mounted in vehicle 105 separate from the other elements of VECD 300. During operation, the data storage 308 may store generated FP 175 (e.g., during or upon completion of a testing cycle) and PRs 179 (e.g., during or upon completion of an operating cycle) prior to delivery to the VPVS 125.

The operating system (OS) may be a general purpose operating system or an operating system specifically written for and tailored to the VECD 300. The OS may include one or more drivers, libraries, and/or application programming interfaces (APIs), which provide program code and/or software components for applications 330 and/or CSCs 179 to control and/or obtain/process data from one or more ECUs 322. The applications 330 may be software modules/components used to perform various functions of the VECD 300.

During operation, the data storage 308 may store one or more CSCs 179. The CSCs 179 may be collections of software modules, program code, logic blocks, etc. that may be used by one or more ECUs 322 to control and/or monitor various systems implemented by the vehicle 105. In embodiments, a CSC 179 may be a selection of software modules, software components, parameters, calibrations, variants, etc. as defined by an arrangement of software elements in a system or device. The CSCs 179 may comprise a System Configuration Description that indicates relevant system information to be integrated into one or more ECUs 322. The System Configuration Description may include one or more ECU extracts including information for a specific ECU 322. Additionally, the System Configuration Description may include one or more ECU Configuration Descriptions comprising basic software configuration information for an individual ECU 322 to generate executable software modules, code of the basic software modules, and/or code of one or more software components. In embodiments, the CSCs 179, when implemented by the VECD 300 and/or ECUs 322 in vehicle 105, the VECD 300 and/or the ECUs 322 may interpret sensor data of sensors 320 and/or system control data of other ECUs 322 using multidimensional performance maps or lookup tables, and may adjust the engine actuators/components accordingly.

In an example, in embodiments where the VECD 300 and/or other ECUs 322 in vehicle 105 are implemented as microcontrollers, the CSCs 179 may comprise one or more software modules, software components, program code, etc. In this example, a first CSC 179 may instruct the VECD 300 to distribute other CSCs 179 to one or more ECUs 322, and to control or instruct the one or more ECUs 322 to generate and execute software components/applications in their corresponding runtime environments (RTEs) according to their corresponding CSCs 179. The software components of the CSCs 179 and/or the software components to be executed by individual ECUs may be implemented using any suitable object-oriented programming language (e.g., C, C++, Java, etc.), schema language (e.g., XML schema, AUTomotive Open System Architecture (AUTOSAR) XML schema, etc.), scripting language (VBScript, JavaScript, etc.), and/or any other programming languages as are well known. Additionally, the CSCs 179 may be generated using a modeling environment or model-based development tools. In another example, in embodiments where the VECD 300 and/or other control modules in vehicle 105 are implemented as field-programmable devices (FPDs) such as FPGAs, structured ASICs, programmable SoCs (PSoCs), etc., the CSCs 179 may be configured or otherwise defined using a hardware description language (HDL), such as register-transfer logic (RTL), very high speed integrated circuit (VHSIC) HDL (VHDL), Verilog, and the like.

The CSCs 179 may have been provisioned in the VECD 300 during production/manufacture of the vehicle 105 and/or the VECD 300, or using over-the-air (OTA) interfaces. When OTA provisioning is used, the CSCs 179 may be provisioned by a vehicle manufacturer, a control system software developer, a remote provisioning service, and/or using some other approved and authenticated OTA system. The OTA provisioning may be accomplished according to known methods or procedures, such as those specified by Groupe Speciale Mobile Association (GSMA) standards, European Telecommunications Standards Institute (ETSI) technical standards, Third Generation Partnership Project (3GPP) technical standards, Open Mobile Alliance (OMA) standards, AUTOSAR standards, and/or other like standards. In some cases, propriety procedures/protocols may be used to provision the CSCs 179.

In embodiments, the vehicle manufacturer, control system developer, etc. may update the CSCs 179 (or components of one or more CSCs 179) by issuing a software update using OTA interfaces in conjunction with an approved and authenticated OTA system (e.g., VPVS 125 or some other like entity) and approved/authorized OTA software residing in the storage 308 (e.g., one of the applications 330). In embodiments where software updates are applied to the CSCs 179 (or components thereof), and/or when a discrepancy between an FP 175 and PRs 177 is detected by the VSVP 125, the VECD 300 may revert back to a previous mode of operation by enabling a desired provisioned version of the CSC 179. For example, the VECD 300 may be commanded or instructed to roll back a software update by the OTA system, and the VECD 300 may implement the authorized OTA software residing in the storage 308 to perform various authentication procedures with the OTA system. The desired version of the CSC 179 to (re-)enable may be provided by the OTA system after the VECD 300 is authenticated, or a stored version of the CSC 179 residing in storage 308 (not shown) may be authenticated by the OTA system during the aforementioned authentication procedure.

The components of VECD 300 and/or vehicle 105 may communicate with one another over the interconnect (IX) 306. In various embodiments, IX 306 may be a controller area network (CAN) bus system, a Time-Trigger Protocol (TTP) system, or a FlexRay system, which may allow various devices (e.g., ECUs 322, sensors 320, Actuators 324, etc.) to communicate with one another using messages or frames. Suitable implementations and general functionality of CAN, TTP, and FlexRay bus systems are known, and are readily implemented by persons having ordinary skill in the art. Additionally or alternatively, the IX 306 may include any number of technologies, such as a Local Interconnect Network (LIN); industry standard architecture (ISA); extended ISA (EISA); peripheral component interconnect (PCI); peripheral component interconnect extended (PCIx); PCI express (PCIe); an Inter-Integrated Circuit (I$^2$C) bus; a serial peripheral interface (SPI), a Parallel Small Computer System Interface; point to point interfaces; a power bus or power management bus (PMBus); Intel® Ultra Path Interface (UPI), Intel® Accelerator Link (IAL), Common Application Programming Interface (CAPI); Intel® QuickPath Interconnect (QPI); Intel® Omni-Path Architecture (OPA) IX; RapidIO™ system interconnects; Ethernet; Cache Coherent Interconnect for Accelerators (CCIA); Gen-Z Consortium IXs; Open Coherent Accelerator Processor Interface (OpenCAPI); a proprietary bus, for example, used in a SoC based interface; or any number of other technologies.

The communications system 305 may include circuitry for communicating with a wireless network or wired network. For example, the communications system 305 may include transceiver (TRx) 311 and network interface controller (NIC) 312. NIC 312 may be included to provide a wired communication to the network 120 and/or other devices. The wired communication may provide an Ethernet connection, Ethernet over GRE Tunnels, Ethernet over Multiprotocol Label Switching (MPLS), Ethernet over USB, or may be based on other types of networks, such as CAN, LIN, DeviceNet, ControlNet, Data Highway+, PROFIBUS, or PROFINET, among many others. Network connectivity may be provided to/from the VECD 300 via NIC 312 using a physical connection, which may be electrical (e.g., a "copper interconnect") or optical. The physical connection also includes suitable input connectors (e.g., ports, receptacles, sockets, etc.) and output connectors (e.g., plugs, pins, etc.). An additional NIC 312 may be included to allow connect to a second network (not shown) or other devices, for example, a first NIC 312 providing communications to the network 120 over Ethernet, and a second NIC 312 providing communications to other devices over another type of network, such as a personal area network (PAN) including a personal computer (PC) device.

The TRx 311 may include one or more radios to wirelessly communicate with the network 120 and/or other devices. The TRx 311 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of VECD 300.

Communications system 305 may include one or more processors (e.g., baseband processors, modems, etc.) that are dedicated to a particular wireless communication protocol (e.g., Wi-Fi and/or IEEE 802.11 protocols), a cellular communication protocol (e.g., 5th Generation (5G) communication systems, Long Term Evolution (LTE), WiMAX, and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.).

The input/output (I/O) interface 318 may include circuitry, such as an external expansion bus (e.g., Universal Serial Bus (USB), FireWire, Thunderbolt, etc.), used to connect VECD 300 with external components/devices, such as sensors 320, electronic control units (ECUs) 322, and actuators 324. The I/O circuitry 318 also includes components such as ports/receptacles, plugs/connectors, host controllers, and/or other like components.

Sensors 320 may be any device configured to detect events or environmental changes, convert the detected events into electrical signals and/or digital data (e.g., sensor data), and transmit/send the signals/data (sensor data) to the VECD 300, one or more ECUs 322, one or more actuators 324, or other subsystems of the vehicle 105. In embodiments, the sensors 320 may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data; catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; an accelerator pedal position sensor (APP); and/or other like sensors embedded in vehicles 105. The sensors 320 may also include other sensors such as inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors, flow/fluid sensors; barometric pressure sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; and/or the like.

Individual ECUs 322 may be embedded systems or other like computer devices that control a corresponding system of the vehicle 105. In embodiments, individual ECUs 322 may each have the same or similar components as the VECD 300, such as a microcontroller or other like processor device, memory device(s), communications interfaces, and the like. In embodiments, the ECUs 322 may include, inter alia, a Drivetrain Control Unit (DCU), an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System and/or any other entity or node in a vehicle system. In some embodiments, the one or more of the ECUs 322 and/or VECD 300 may be part of or included in a Portable Emissions Measurement Systems (PEMS).

The Actuators 324 may be devices that allow VECD 300 to change a state, position, orientation, move, and/or control a mechanism or system. The actuators 324 comprise electrical and/or mechanical devices for moving or controlling a mechanism or system, and converts energy (e.g., electric current or moving air and/or liquid) into some kind of motion. The actuators 324 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. Additionally or alternatively, the actuators 324 may include one or more electromechanical devices such as valve actuators, fuel injectors, ignition coils, pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The VECD 300 and/or ECUs 322 may be configured to operate one or more actuators 324 based on one or more captured events and/or instructions or control signals received from VPVS 125 and/or from various subsystems of the vehicle 105 (e.g., processor 302, one or more ECUs 322, one or more sensors 321, battery 328, communications systems 305, etc.). In these embodiments, VECD 300 and/or ECUs 322 may be configured to generate and transmit/send instructions or control signals to the actuators 324 based on the detected events and/or the received control signals. In embodiments, the VECD 300 may generate and transmit/send instructions to various actuators 324 (or ECUs 322/controllers that control the various actuators 324) to reconfigure operating parameters of those actuators 324 according to the various embodiments discussed herein.

In embodiments, individual ECUs 322 may be capable of reading or otherwise obtaining sensor data from one or more sensors 320, processing the sensor data to generate control system data, and providing the control system data to the VECD 300 for inclusion in the FP 175 and/or PR 177. For example, an ECM or ECU may provide engine revolutions per minute (RPM) of an engine of the vehicle 105, fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the EMC/ECU by the TCU), real-time calculated engine load values from the ECM, etc.; a TCU may provide transmission gear ratio data, transmission state data, etc.; and the like.

The battery 328 may power the VECD 300. In embodiments, the battery 328 may be a typical lead-acid automotive battery, although in some embodiments, such as when vehicle 105 is a hybrid vehicle, the battery 328 may be a lithium ion battery, a metal-air battery, such as a zinc-air battery, an aluminum-air battery, a lithium-air battery, and the like. The battery monitor 326 may be included in the VECD 300 to track/monitor various parameters of the battery 328, such as a state of charge (SoCh) of the battery 328, state of health (SoH), and the state of function (SoF) of the battery 328. The battery monitor 326 may include a battery monitoring IC, which may communicate battery information to the processor 302 over the IX 306.

The positioning (PoS) circuitry 345 (and associated applications) may be included in or connected with VECD 300 to determine a geolocation of the vehicle 105. The PoS circuitry 345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The PoS circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the PoS circuitry 345 may include a Micro-Technology for Positioning, Navigation, and Timing (Micro-PNT) IC that uses a master timing clock to perform position tracking/estimation without GNSS assistance. The PoS circuitry 345 may also be part of, or interact with, the communication circuitry 305 to communicate with the nodes and components of the positioning network. The PoS circuitry 345 may also provide position data and/or time data to the application circuitry (e.g., processor 302, memory 304, and/or storage 308), which may use the data to synchronize operations with various infrastructure (e.g., radio base stations), for turn-by-turn navigation, determine fingerprint data, and/or the like.

While not shown, various other devices may be present within, or connected to, the VECD 300. For example, I/O devices, such as a display, a touchscreen, or keypad may be connected to the VECD 300 via IX 306 to accept input and display outputs. In another example, the VECD 300 and/or the communications system 305 may include a Universal Integrated Circuit Card (UICC), embedded UICC (eUICC), and/or other elements/components that may be used to communicate over one or more wireless networks.

Figure 4:
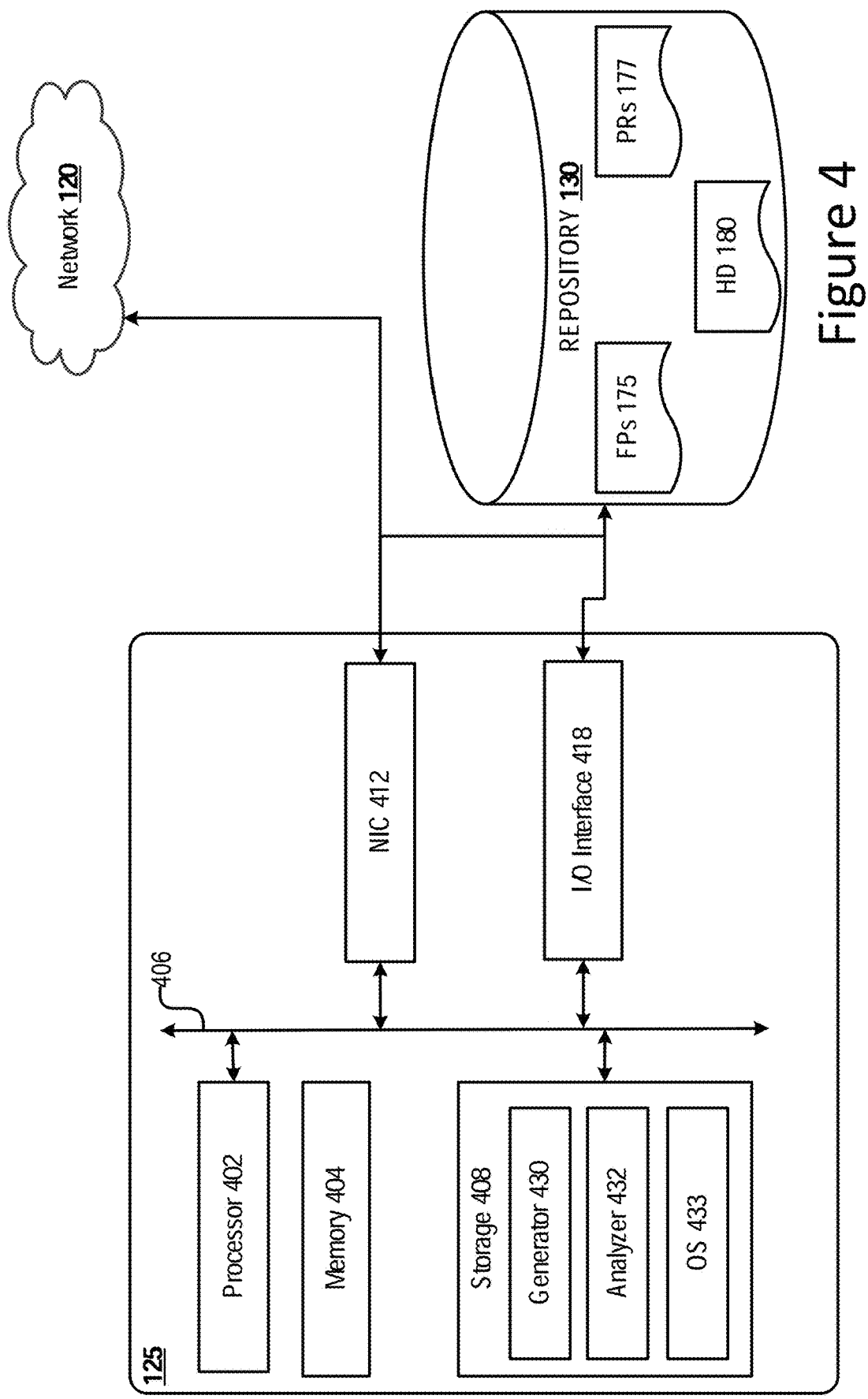
FIG. 4 illustrates an example implementation of a vehicle performance verification system (VPVS), in accordance with various embodiments.

FIG. 4 illustrates the components of the VPVS 125, in accordance with various embodiments. As shown by FIG. 4, VPVS 125 includes various components that may be the same or similar to components discussed with regard to FIG. 3. For example, processor 402 may be the same or similar as processor 302, memory 404 may be the same or similar as memory 304, bus 406 may be the same or similar as IX 306, storage 408 may be the same or similar as storage 308, NIC 412 may be the same or similar as NIC 312, I/O interface 418 may be the same or similar as interface 318, each of which may operate in a same or similar manner as discussed with regard to FIG. 3. For the sake of brevity, only the differences between elements of VECD 300 and VPVS 125 are discussed infra.

In embodiments, the I/O interface 418 may be used to obtain and store information in the repository 130 using for example, a USB connection when the repository 130 is implemented in one or more local data storage devices. In some embodiments, the NIC 412 may be used to obtain and store information in the repository 130 using for example, an Ethernet connection when the repository 130 is implemented as a distributed database system.

In embodiments, the memory 404 may include operating system (OS) 433, generator 430, analyzer 432, and other application(s). OS 433 may manage computer hardware and software resources and provide common services for computer programs. OS 433 may include one or more drivers that provide an interface to hardware devices thereby enabling OS 433, generator 430, analyzer 432, and other application(s) to access hardware functions without needing to know the details of the hardware itself. The OS 433 may be a general purpose operating system or an operating system specifically written for and tailored to the VPVS 125.

The analyzer 432 may be a collection of software module and/or program code, which when executed by the processor 404, enables the VPVS 125 to operate according to the various example embodiments as discussed herein, such as by obtaining PRs 177, FPs 175, and other information from the repository 130 and/or vehicle 105, comparing data items of the PRs 177 with data items of a FPs 175, and/or obtaining/storing data from/in the repository 130. In embodiments, analyzer 432 may also enable the VPVS 125 to obtain other data (e.g., weather reports, traffic reports, road condition data, etc.) from other data sources for determining the variances between the FPs 175 and PRs 177.

The generator 430 may be a collection of software module and/or program code, which when executed by the processor 404, enables the VPVS 125 to generate the HD 180 based on the comparison of the FPs 175 and PRs 177. In embodiments, this may include generating a timestamp and/or other like data associated with generation of the HD 180 and/or a timestamp of the verification/analysis procedure performed by the analyzer 432, as well as linking this information to the FP 175 and/or PRs 177 used during the verification/analysis procedure. In addition, the generator 430 may also generate flags, alerts, etc. when the variance between an FP 175 data item and a PR 177 data item is greater than a threshold value. The flags/alerts may comprise various data objects in a computer-readable form that can be compiled and rendered as a visual representation by a computer device, such as a client device or user system. For example, the flags/alerts may be an HTML document, an XML document, a JSON document, a CFML document, and/or using some other suitable data format that may be decoded and rendered by a browser or application container of a client device.

In some embodiments, the generator 430 may also generate a message that instructs the VECD 300 to enable a desired version of a CSC 179, which may be provided to the VECD 300 using OTA interfaces, for example. In other embodiments, a separate OTA system may be used to instruct the VECD 300 to revert back to the desired version of the CSC 179 as discussed previously.

While not shown, various other devices may be present within, or connected to, the VPVS 125. For example. I/O devices, such as a display, a touchscreen, or keypad may be connected to the VPVS 125 via bus 406 to accept input and display outputs.

Figure 5A:
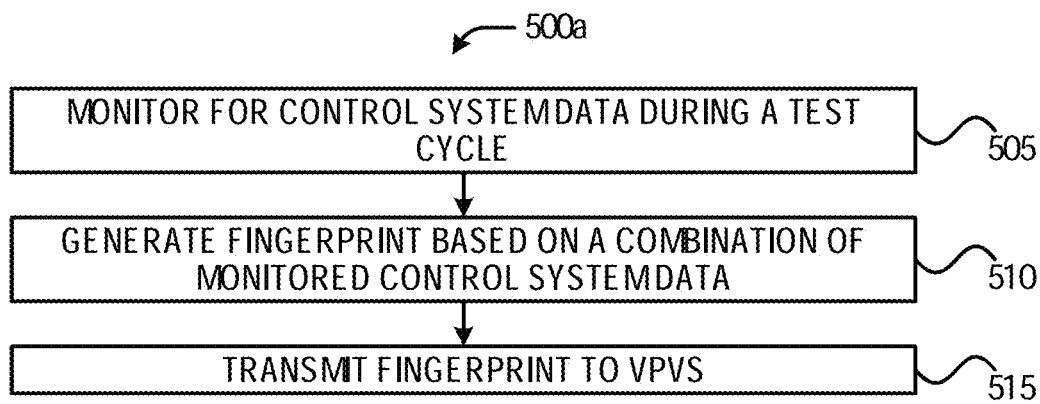
FIGS. 5a-5b illustrate example processes that may be performed by a VECD, in accordance with various embodiments. In particular.
Figure 5B:
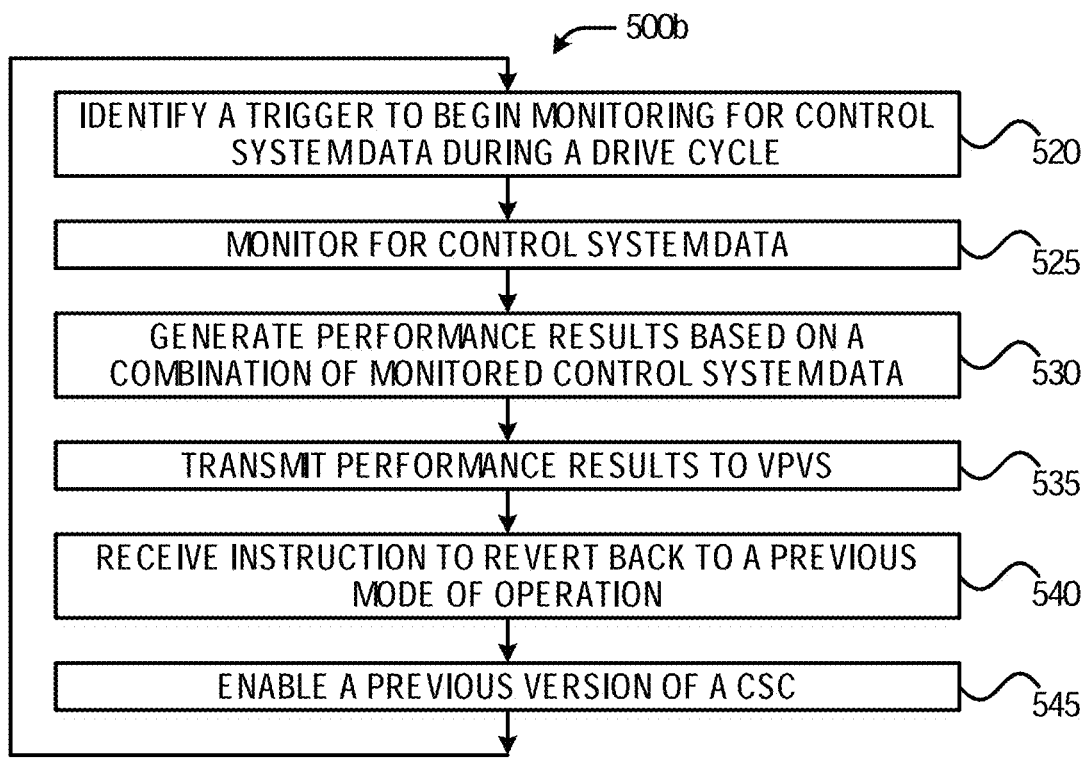
Figure 6A:
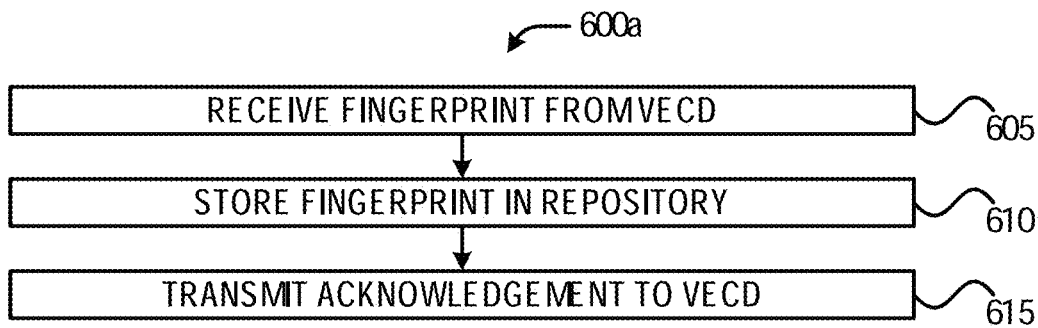
FIGS. 6a-6b illustrate example processes that may be performed by a VPVS, in accordance with various embodiments. In particular.
Figure 6B:
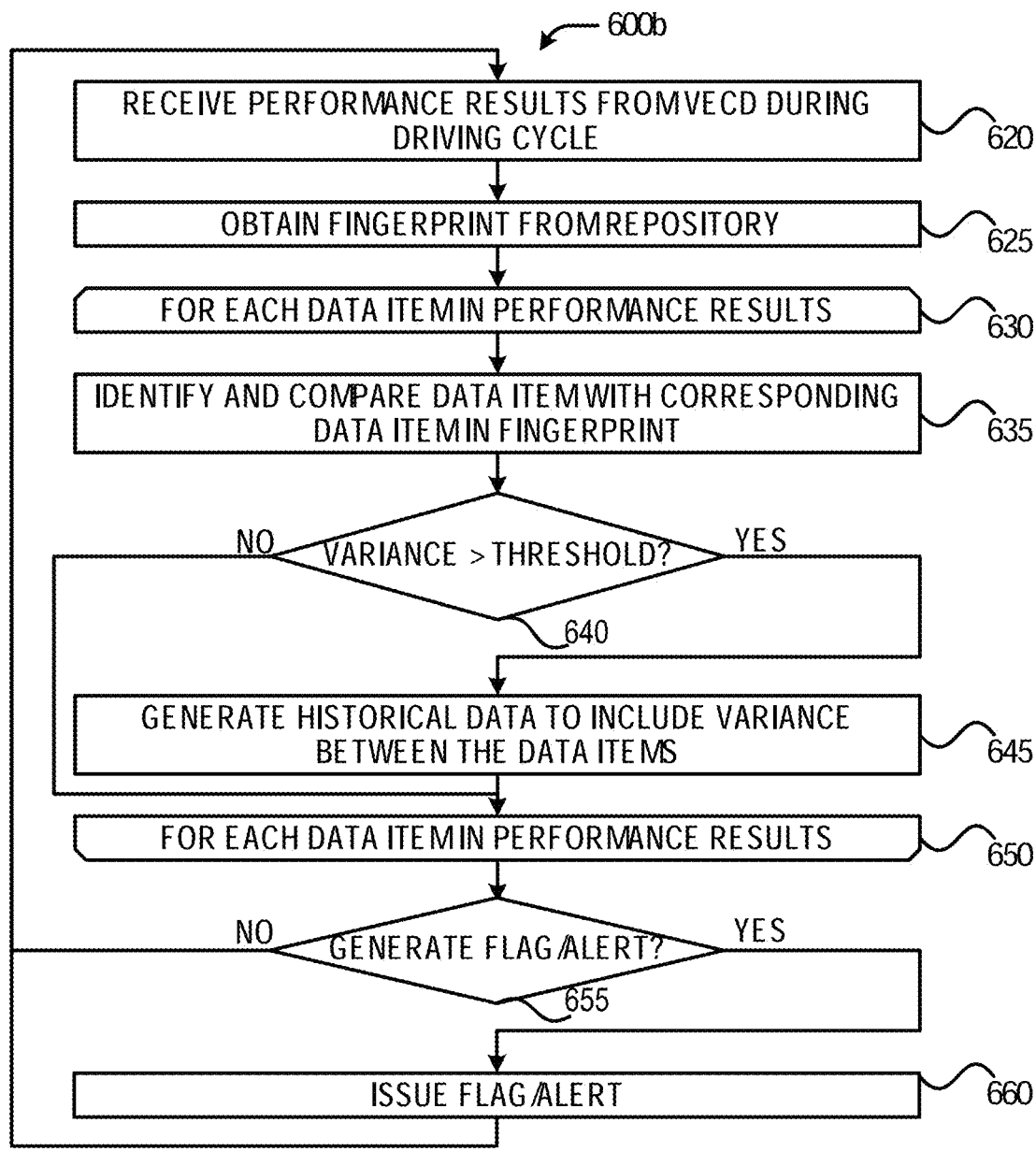

FIGS. 5a and 5b illustrate processes 500a and 500b, respectively, performed by VECD 300, in accordance with various embodiments. FIGS. 6a and 6b illustrate processes 600a and 600b, respectively, performed by the VPVS 125, in accordance with various embodiments. For illustrative purposes, the operations of the aforementioned processes are described as being performed by the various elements discussed with regard to FIGS. 1-4. However, it should be noted that other computing devices may operate these processes in a multitude of implementations, arrangements, and/or environments. In embodiments, the processes may be implemented as program code, which when executed by a processor, causes a computer system to perform the various operations of the processes. While particular examples and orders of operations are illustrated in FIGS. 5a-5b and 6a-6b, in various embodiments, these operations may be re-ordered, separated into additional operations, combined, or omitted altogether.

FIG. 5a shows an example process 500a for generating and reporting fingerprint data 175 in accordance with various embodiments. Process 500a may begin at operation 505 where the processor 302 of VECD 300 may monitor for control system data during a test cycle, such as an emissions test cycle performed in a controlled environment. The act of monitoring may include capturing control system data (CSD) and/or sensor data. In embodiments, the act of monitoring may include polling (e.g., periodic polling, sequential (roll call) polling, etc.) one or more sensors 320 and/or one or more ECUs 322 for control system data (CSD) for a specified/selected period of time. In other embodiments, monitoring may include sending a request or command for sensor data/CSD in response to an external request for sensor data/CSD. In some embodiments, monitoring may include waiting for sensor data/CSD from various sensors/modules based on triggers or events, such as when the vehicle 105 reaches predetermined speeds and/or distances in a predetermined amount of time (with or without intermitted stops). The events/triggers may be based values delineated by standardized testing protocols/procedures. In various embodiments, the monitoring may be triggered or activated by a remote device, such as a testing or emissions monitoring computer device (e.g., the aforementioned laptop, etc.) or VPVS 125.

At operation 510, the processor 302 may generate the FP 175 based on a combination of the monitored CSD. For example, in embodiments where the vehicle 105 is an ICE (gasoline) vehicle, the FP 177 may comprise exhaust oxygen (02) sensor outputs for one or more 02 sensors; engine RPMs; fuel injector timings (e.g., on times and off time) for one or more cylinder; calculated or measured intake air flow values; intake air temperature; ambient air pressure and temperature; catalytic converter temperature; transmission gear ratio spark timing for one or more cylinders; vehicle speed; EGR activity/status; and/or other like information. In another example, in embodiments where the vehicle 105 is a CCE (diesel) vehicle, the FP 177 may comprise the same data items as the ICE vehicle except that the spark timing data may be omitted.

At operation 515, the processor 302 may generate a message including the FP 175, and may control the communications system 305 to transmit the message to the VPVS 125 over network 120. In other embodiments, the FP 175 may be transferred to another computer device (e.g., a laptop computer or some other monitoring device) via a wired connection (e.g., USB cable), and the other computer device may transfer the FP 175 to the VPVS 125 according to know methods/procedures.

Process 500b shows an example process 500b for generating and reporting performance results 177 in accordance with various embodiments. Process 500b may begin at operation 520 where the processor 302 may identify a trigger to begin monitoring for sensor data/CSD during an operating cycle, such as when the vehicle 105 is deployed and operated by an end-user. In embodiments, the trigger may be receipt of an external request for sensor data/CSD from a remote device, such as the VPVS 125. In some embodiments, the trigger may be one or more detected events, such as when the vehicle 105 reaches predetermined speeds and/or distances in a predetermined amount of time (with or without intermitted stops). The events may be based values delineated by standardized testing protocols/procedures. In some embodiments, the trigger may be expiration of a timer with a predefined or random value, which may be configured using a CSC 179, for example.

At operation 525, the processor 302 may monitor for CSD in response to detection of the trigger. Operation 525 may be the same or similar as operation 505 except for the particular environment in which the operations are performed and/or the particular modules/sensors to be monitored.

At operation 530, the processor 302 may generate the PRs 177 based on a combination of the monitored CSD. The PRs 177 may include the same or similar data as the FPs 175 generated at operation 510. Additionally or alternatively, in some embodiments, the processor 302 may generate the PRs 177 to comprise any of the following data items: a real-time calculated or measured airflow entering the engine's intake system; real-time calculated engine load; real-time fuel injection timings (e.g., on and off durations) for one or more cylinders or one or more injectors; ignition spark timing events relative to crank angle for one or more cylinders; exhaust sensor readings relative to fuel injection on and off events; catalytic converter temperature sensor data; catalytic converter O2 sensor data; transmission state data; vehicle speed; ambient conditions; and the like. In embodiments, the generated PRs 177 may be stored in the storage 308 or some other memory device prior to being transmitted to the network 120.

At operation 535, the processor 302 may generate a message including the PRs 177, which may be provided to the communications system 305 for transmission of the message to the VPVS 125 over network 120. In other embodiments, the PRs 177 may be transferred to another computer device (e.g., a laptop computer or some other monitoring device) via a wired connection (e.g., USB cable), and the other computer device may transfer the FP 175 to the VPVS 125 according to known methods/procedures. After performance of operation 535, the processor 302 may proceed back to operation 520 to detect a trigger for monitoring for CSD/sensor data.

At operation 540, the communications system 305 may receive a message comprising an instruction to revert back to a previous mode of operation, and at operation 545 the processor 302 may implement a desired version of a CSC 179. In some embodiments, the desired version may be stored in storage 308 and authenticated by an authorized/approved OTA system. In other embodiments, the desired version may be provided to the VECD 300 by the approved/authorized OTA system. In either embodiment, the processor 302 may implement OTA software to perform an authentication procedure in order to obtain the desired version or authenticate the desired version of a stored CSC 179. The act of implementing the desired version of the CSC 179 may include providing individual ECUs with corresponding ECU Configuration Descriptions contained in the desired version of the CSC 179 so that the individual ECUs may generate and operate software modules/components to perform one or more desired functions. It should be noted that the FP 175 generated by process 500a or an FP 175 collected using some other method/procedure may be used to test the control system operations of various other vehicles 105 that have a same or similar make, model, and trim as the tested vehicle 105. This is because, although the operational engine input and output values from various vehicle 105 may be somewhat different, the engine input and output values should not vary to the degree that would be seen between when the engine systems are optimized for fuel economy versus emissions control.

FIG. 6a shows an example process 600a for obtaining fingerprint data in accordance with various embodiments. Process 600a may begin at operation 605 where NIC 412 may receive an FP 175 from VECD 300 of vehicle 105. At operation 610, the processor 402 may control the NIC 412 and/or the I/O interface 418 to store the FP 175 in the repository 130. At operation 615, the processor 402 may generate an acknowledgment (ACK) message indicating that the FP 175 was properly received and stored, and may provide the ACK message to the NIC 412 for transmission to the VECD 300. In embodiments, if the receipt and/or storage of the FP 175 failed or was otherwise rejected, the ACK message may indicate the failure and/or a reason for the failure. Process 600a may end or repeat as necessary after operation 615.

FIG. 6b shows an example process 600b for configuring a VECD in accordance with various embodiments. Process 600b may begin at operation 620 where the processor 402 receives PRs 177 of an operating cycle from the VECD 300 via NIC 412. At operation 625, the processor 402 may control the NIC 412 and/or the I/O interface 418 to obtain the stored FP 175 (see operation 610 of process 600a) from the repository 130. Operation 625 may also include the processor 402 controlling the NIC 412 and/or the I/O interface 418 to store the received PRs 177 in the repository 130.

At starting loop operation 630, the processor 402 may implement the analyzer 432 to extract the data items from the PR 177 and processes each data item of the PR 177 in turn. At operation 635, the processor 402 may implement the analyzer 432 to identify and compare the data item of the PR 177 with a corresponding data item in the FP 175. At operation 640, the processor 402 may implement the analyzer 432 to determine whether a variance between the compared data items is greater than a predetermined threshold value (e.g., standard deviation, margin of error, etc.).

For example, when the vehicle 105 includes an ICE, the EMS or other like control module/system may be designed to control the fuel and spark systems of the vehicle 105 in order to achieve a greatest efficiency from the vehicle's catalytic converter. When a catalytic converter is operating efficiently it may significantly reduce the three main emissions cause by an internal combustion engine, such as HC, 2NOx, and 2CO. However, in order for the EMS to manage catalytic converter efficiency, the fuel and spark systems of the engine may not provide the most optimum fuel consumption and/or fuel economy engine is capable of achieving. The difference between a vehicle's EMS calibration for fuel economy versus EMS calibration for emissions reduction/limitation can be seen by tables 1 and 2 below.

TABLE 1

| Engine Input | Engine Outputs | | | |
|---|---|---|---|---|
| Air-to-Fuel Ratio (AFR) | Exhaust 02 sensor | Catalytic Converter Temperature | The resultant chemical composition of the engine's exhaust exiting the vehicle | Fuel Economy while maintaining drivability |
| 13.8:1 | ~30 of sensor's rich range | excessive | Increase in unburnt Hydro Carbons | Worst Economy |
| 14.2:1 | ~15 of sensor's rich range | optimal | Most efficient reduction of three main emissions | Less economy than 14.7:1 |
| 14.7:1 | 0 | Not optimal | Slight emissions increase over 14.2:1 | Less economy than 15.2:1 |
| 15.2:1 | ~15 of sensor's lean range | Reduced efficiency | 2NOx Emissions increase over 14.2:1 | Less economy than 15.8:1 |
| 15.6:1 | ~30 of sensor's lean range | In efficient | 2NOx Emissions increase over 14.7:1 | Best economy |

TABLE 1-continued

| Engine Input | Engine Outputs | | | |
|---|---|---|---|---|
| Air-to-Fuel Ratio (AFR) | Exhaust 02 sensor | Catalytic Converter Temperature | The resultant chemical composition of the engine's exhaust exiting the vehicle | Fuel Economy while maintaining drivability |
| 16.2:1 | ~50 of sensor's lean range | Significant loss of oxidation and reduction capabilities | 1) Spike in unburnt Hydro Carbons; 2) Spike in 2NOx | Significant Loss of economy |

TABLE 2

| Engine Input | Engine Outputs | | | |
|---|---|---|---|---|
| Spark-Timing advance | Catalytic Converter Temperature | The resultant chemical composition of the engine's exhaust exiting the vehicle | | Fuel Economy while maintaining drivability |
| 10 degree retard | Excessive temperature increase | Increase in unburnt Hydro Carbons | | Significant Loss of economy and emission due to miss fire |
| 5 degree retard | Increased temperature | Efficient reduction of 2NOx (plus reduction of 2CO and HC at cold start temperatures) | | Less economy at heavy loads |
| 0 TDC | Just off optimal | Slight emissions increase at higher loads | | Less economy |
| −5 degree advance | Optimal range at high engine load | Lower exhaust emissions | | Good economy |
| −10 degree advance | Optimal range at high engine load | Slight Emissions increase at low RPMs | | Good economy |
| −15 degree advance | Drop in temperature | Emissions increase | | Reduced economy |

In table 1, the engine input may be a ratio of air versus fuel that is based on a calculated or measured intake airflow to a fuel injector flow rate, which may be controlled by a fuel injection ECU, such as a PCM and the like. In table 2, the engine input may be a spark ignition timing relative to a TDC of crankshaft rotation under medium to heavy engine load. As can be seen by tables 1 and 2, the optimal EMS calibrations for emissions reduction and fuel economy happen at different AFRs and/or spark ignition points. Therefore, in embodiments, at operations 635-640 the analyzer 432 may determine whether the AFR and/or the spark timing indicated by the PR 177 varies or differs from the AFR and/or the spark timing indicated by FP 175 by a predetermined or selected threshold. In such embodiments, the threshold may indicate a different between a desired AFR (e.g., indicated by data items of the FP 175 and/or a regulation/standard) and an actual AFR (e.g., indicated by data items of the PRs 177), and/or the threshold may indicate a different between a desired spark timing (e.g., indicated by data items of the FP 175 and/or a regulation/standard) and an actual spark timing (e.g., indicated by data items of the PRs 177).

In various embodiments, the analyzer 432 may take into account the stoichiometric AFR for different fuels, such as gasoline and diesel, and their flammability ranges in order to determine the real time AFRs and associated engine control system input and output values. Additionally, the specific threshold values used at operations 635-640 may be based on various vehicle parameters, such as a make, model, and/or trim of vehicle 105; odometer readings; driving conditions (weather, traffic, etc.); etc.

Referring back to FIG. 6b, if at operation 640 the analyzer 432 determines that the variance between the compared data items is not greater than a predetermined threshold value, then the processor 402 may implement the analyzer 432 to proceed to ending loop operation 650 to process a next data item of the PR 177 (if any). If at operation 640 the analyzer 432 determines that the variance between the compared data items is greater than the predetermined threshold value, then the processor 402 may implement the generator 430 to proceed to operation 645 to generate HD 180 to include or indicate the variance between the data item in the PRs 177 and the data item in the FP 175.

The processor 402 may implement the analyzer 432 to return to operation 630 to process a next data item of the PR 177 (if any). Once the HD 180 is generated based on the all items in the PR 177, the processor 402 may proceed to operation 655 to implement the generator 430 to determine if a flag/alert should be generated, such as when at least one data item of the PRs 177 varies from a corresponding data item of the FP 175 by a threshold. If the generator 430 determines that a flag/alert should not be generated, then the processor 402 may proceed back to operation 620 to obtain PRs 177 during a future operating cycle. If the generator 430 determines that a flag/alert should be generated, then the processor 402 may proceed to operation 660 and implement the generator 430 to generate and send, via the NIC 412, the flag/alert to a remote computer device, such as a client device or server operated by a regulatory agency or vehicle manufacturer, or some other service provider (e.g., an OTA system) that is responsible for configuring the control system of the vehicle 105. In some embodiments, the remote computer device (e.g., the OTA system) may instruct the VECD 300 to roll back a software update in response to receipt of the flag/alert. In other embodiments, at operation 660 the generator 430 may generate a message to instruct the VECD 300 to roll back the software update, and the message may be sent to the VECD 300 using the NIC 412. After performance of operation 660, the process 600*b* may end or repeat as necessary.

It should be noted that the PR 177 may be compared with a generic or other like template FP 175 that is generated or associated with another vehicle that has a same or similar make, model, and trim as the vehicle 105 associated with the PR 177 obtained at operation 620. This is because, although the operational engine input and output values from various vehicles 105 may be somewhat different, the engine input and output values should not vary to the degree that would be seen between when the engine systems are optimized for fuel economy versus emissions control.

Most of the equipment discussed above comprises hardware and associated software. For example, the typical electronic device is likely to include one or more processors and software/program code executable on those processors to carry out the operations described. The term software used herein in its commonly understood sense may refer to programs or routines (subroutines, objects, plug-ins, etc.), as well as data or data structures, usable by a machine or processor to perform particular tasks or implement particular data types. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("onboard" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download" or "provision"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A memory storing instructions, wherein execution of the instructions by at least one processor performs operations comprising:
   during a testing cycle,
      monitor for control system data provided by one or more control systems embedded in a vehicle;
      generate a vehicle fingerprint based on a combination of the control system data monitored during the testing cycle, wherein the vehicle fingerprint is based on data obtained from individual components embedded in the vehicle or from a plurality of sensors embedded in the vehicle, in combination with a first version of a control system configuration of the vehicle; and
      control transmission of a fingerprint message including the vehicle fingerprint to a computing device remote from the vehicle; and
   during an operating cycle,
      monitor for control system data provided by the one or more control systems;
      generate performance results for comparison against the vehicle fingerprint, wherein the performance results are generated based on a combination of the control system data monitored during the operating cycle, wherein the performance results are based on data obtained from the individual components or from the plurality of sensors embedded in the vehicle, in combination with a second different version of the control system configuration; and
      control transmission of a performance results message including the performance results to the remote computing device.

2. The memory of claim 1, wherein each of the one or more control systems include one or more control modules associated with the individual components or the plurality of sensors.

3. The memory of claim 2, wherein generate the performance results further comprises:
   determine, based on the control system data monitored during the operating cycle, real-time operation parameters during the operating cycle matching operation parameters defined by a test procedure of the testing cycle; and
   generate the performance results to include data items of the control system data corresponding to the real-time operation parameters.

4. The memory of claim 3, wherein the test procedure is a vehicle emissions test procedure, and wherein the vehicle emissions test procedure defines operation parameters during which the control system data monitored during the testing cycle is to be provided.

5. The memory of claim 3, wherein the data items of the control system data monitored during the operating cycle comprise:
   real-time calculated or measured intake air temperature (IAT) data of TAT sensors of the plurality of sensors;
   real-time calculated engine load values from an engine control module (ECM), the ECM being among the individual components;
   real-time fuel injector activation timing data of one or more cylinders or one or more injectors from the ECM;
   ignition spark timing data of the one or more cylinders from the ECM, wherein the ignition spark timing data indicates spark events relative to crank angle of the one or more cylinders; and
   exhaust sensor data of exhaust sensors of the plurality of sensors relative to fuel injection timing events of the fuel injector activation timing data, wherein the exhaust sensors include exhaust oxygen sensors and manifold absolute pressure (MAP) sensors of the plurality of sensors.

6. The memory of claim 2, wherein the combination of the control system data monitored during the testing cycle comprises:
   exhaust oxygen data from exhaust oxygen sensors of the plurality of sensors;
   engine revolutions per minute (RPM) of an engine of the vehicle from an ECM, the ECM being among the individual components;
   fuel injector activation timing data of one or more cylinders or one or more injectors of the engine from the ECM;
   ignition spark timing data of the one or more cylinders from the ECM; and
   intake air flow data from mass air flow (MAF) sensors of the plurality of sensors.

7. The memory of claim 1, wherein the operations further comprise:
   detect a first trigger to monitor for the control system data during the testing cycle prior to the monitoring for the control system data during the testing cycle; and
   detect a second trigger to monitor for the control system data during the operating cycle prior to the monitoring for the control system data during the operating cycle.

8. The memory of claim 1, wherein the operations further comprise:
   receive a command to implement a desired version of the control system configuration for at least one control system of the one or more control systems based on the performance results;
   obtain the desired version based on the command; and
   provision the desired version in the at least one control system.

9. The memory of claim 8, wherein:
   the desired version is the first version of the control system configuration or another previously implemented version of the control system configuration when the vehicle is not verified as operating according to the desired performance parameters, and
   the desired version is a third version of the control system configuration that is different than the second version of the control system configuration when the vehicle is verified as operating according to the desired performance parameters.

10. A computer system comprising:
    memory circuitry arranged to store one or more control system configurations;
    processor circuitry coupled with the memory circuitry, wherein the processor circuitry is arranged to:
      generate a vehicle fingerprint based on control system data collected from one or more control systems embedded in a vehicle during a testing cycle, wherein the vehicle fingerprint is based on data obtained from individual components embedded in the vehicle or from a plurality of sensors embedded in the vehicle, in combination with a first version of a control system configuration; and
      generate performance results for comparison against the vehicle fingerprint, wherein the performance results are generated based on control system data collected from the one or more control systems during an operating cycle, wherein the performance results are based on data obtained from the individual components or from the plurality of sensors embedded in the vehicle, in combination with a second different version of the control system configuration; and
    communication circuitry communicatively coupled with the processor circuitry, wherein the communication circuitry is arranged to:
      transmit a fingerprint message including the vehicle fingerprint to a computing device remote from the vehicle, and
      transmit a performance results message including the performance results to the remote computing device.

11. The computer system of claim 10, wherein the computer system is communicatively coupled with at least one control system of the one or more control systems via interconnect circuitry, and each of the one or more control systems includes one or more control modules associated with the individual components or the plurality of sensors.

12. The computer system of claim 11, wherein the processor circuitry is further arranged to:
    collect the control system data from the one or more control modules associated with the individual components or the plurality of sensors.

13. The computer system of claim 11, wherein the interconnect circuitry is one of a controller area network (CAN), a Time-Trigger Protocol (TTP) system, or a FlexRay system.

14. The computer system of claim 11, wherein, to generate the performance results, the processor circuitry is further arranged to:
    determine, based on the control system data collected during the operating cycle, real-time operation parameters during the operating cycle matching the operation parameters defined by a test procedure of the testing cycle; and
    generate the performance results to include data items of the control system data corresponding to the real-time operation parameters.

15. The computer system of claim 14, wherein the test procedure is a vehicle emissions test procedure, wherein the vehicle emissions test procedure defines operation parameters during which the control system data collected during the testing cycle is to be collected.

16. The computer system of claim 14, wherein the data items of the control system data collected during the operating cycle comprise:
    real-time calculated or measured intake air temperature (IAT) data of TAT sensors of the plurality of sensors;

real-time calculated engine load values from an engine control module (ECM), the ECM being among the individual components;
real-time fuel injector activation timing data of the one or more cylinders or the one or more injectors from the ECM;
ignition spark timing data of the one or more cylinders from the ECM, wherein the ignition spark timing data indicates spark events relative to crank angle of the one or more cylinders; and
exhaust sensor data of exhaust sensors of the plurality of sensors relative to fuel injection timing events of the fuel injector activation timing data, wherein the exhaust sensors include the exhaust oxygen sensors and manifold absolute pressure (MAP) sensors of the plurality of sensors.

17. The computer system of claim 11, wherein the combination of the control system data collected during the testing cycle comprises:
exhaust oxygen data from exhaust oxygen sensors of the plurality of sensors;
engine revolutions per minute (RPM) of an engine of the vehicle from an ECM, the ECM being among the individual components;
fuel injector activation timing data of one or more cylinders or one or more injectors of the engine from the ECM;
ignition spark timing data of the one or more cylinders from the ECM; and
intake air flow data from mass air flow (MAF) sensors of the plurality of sensors.

18. The computer system of claim 10, wherein the processor circuitry is further arranged to:
detect a first trigger to monitor for the control system data during the testing cycle prior to the monitoring for the control system data during the testing cycle; and
detect a second trigger to monitor for the control system data during the operating cycle prior to the monitoring for the control system data during the operating cycle.

19. A memory storing instructions, wherein execution of the instructions by at least one processor of a first computing device remote from a vehicle performs operations comprising:
receive, from a second computing device, a performance results message including performance results of the vehicle, the performance results for comparison against a vehicle fingerprint and being based on control system data collected from one or more control systems embedded in the vehicle, the vehicle fingerprint being based on a combination of control system data collected during a test procedure, wherein the vehicle fingerprint is further based on data obtained from individual components embedded in the vehicle or from a plurality of sensors embedded in the vehicle, in combination with a first version of a control system configuration of the vehicle;
wherein the performance results are further based on data obtained from the individual components or from the plurality of sensors embedded in the vehicle, in combination with a second different version of the control system configuration;
compare data items of the performance results with data items of the vehicle fingerprint of the vehicle;
generate a flag when at least one data item of the data items of the performance results is different than a corresponding data item of the data items of the vehicle fingerprint.

20. The memory of claim 19, wherein the operations further comprise:
obtain the vehicle fingerprint from a vehicle repository;
generate a timestamp for the comparison of the data items of the performance results with the data items of the vehicle fingerprint;
generate historical data including the timestamp and the flag; and
control storage of the historical data in the vehicle repository.

* * * * *